United States Patent
Kanai et al.

(10) Patent No.: US 9,608,966 B2
(45) Date of Patent: *Mar. 28, 2017

(54) INFORMATION HANDLING DEVICE, INFORMATION OUTPUT DEVICE, AND RECORDING MEDIUM

(71) Applicant: KABUSHIKI KAISHA TOSHIBA, Minato-ku, Tokyo (JP)

(72) Inventors: Jun Kanai, Tokyo (JP); Hiroshi Isozaki, Kanagawa-ken (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 26 days.

This patent is subject to a terminal disclaimer.

(21) Appl. No.: 13/967,614

(22) Filed: Aug. 15, 2013

(65) Prior Publication Data

US 2014/0052986 A1 Feb. 20, 2014

(30) Foreign Application Priority Data

Aug. 17, 2012 (JP) ................................ 2012-181021

(51) Int. Cl.
*H04L 29/06* (2006.01)
*H04L 29/08* (2006.01)

(52) U.S. Cl.
CPC .......... *H04L 63/0428* (2013.01); *H04L 63/06* (2013.01); *H04L 63/0823* (2013.01); *H04L 67/02* (2013.01); *H04L 63/18* (2013.01)

(58) Field of Classification Search
CPC ..... H04L 63/08; H04L 63/10; H04L 63/0428; H04L 63/0823; H04L 63/06
(Continued)

(56) References Cited

U.S. PATENT DOCUMENTS 7,484,089 B1 * 1/2009 Kogen et al. ................ 713/156
2002/0095507 A1 * 7/2002 Jerdonek ............... H04L 9/3271
709/229

(Continued)

FOREIGN PATENT DOCUMENTS

JP 2005-149205 6/2005

OTHER PUBLICATIONS

Japanese Office Action for Japanese Patent Application No. 2015-213790 mailed on Jul. 1, 2016. Translated to English by Global Dossier on Aug. 2, 2016. Dictionary Last Updated Jul. 24, 2016.

*Primary Examiner* — Linglan Edwards
*Assistant Examiner* — Quazi Farooqui
(74) *Attorney, Agent, or Firm* — Amin, Turocy & Watson LLP

(57) ABSTRACT

An information handling device has a first connection unit, a Web application executing unit to generate a device operating command, a second connection unit, an application authentication processing unit to generate a platform authenticator, an application origin information attacher to attach origin information of the web application to the platform authenticator, and a third connection unit to establish a connection for transmitting the device operating command and the platform authenticator attached with the origin information to the second communication device in order to transmit the device operating command and the platform authenticator attached with the origin information.

18 Claims, 26 Drawing Sheets

(58) Field of Classification Search
USPC ......... 713/168–174, 182–186, 202; 726/2–8; 709/206, 225, 229, 249, 389
See application file for complete search history.

(56) References Cited

U.S. PATENT DOCUMENTS

| | | | | |
|---|---|---|---|---|
| 2002/0120607 | A1* | 8/2002 | Price | G06Q 10/10 |
| 2005/0271044 | A1* | 12/2005 | Hsu | H04L 12/40 370/360 |
| 2007/0056025 | A1* | 3/2007 | Sachdeva et al. | 726/5 |
| 2012/0254352 | A1* | 10/2012 | Ito | G06F 17/30902 709/217 |
| 2013/0318354 | A1* | 11/2013 | Entschew | G06F 21/645 713/175 |

\* cited by examiner

| KEY NO. | KEY VALIDITY | KEY INFORMATION |
|---|---|---|
| 0 | INVALID | key0 |
| 1 | VALID | key1 |
| 2 | VALID | key2 |
| 3 | VALID | key3 |
| ...... | ...... | ...... |
| N | VALID | keyN |

INFORMATION HANDLING DEVICE, INFORMATION OUTPUT DEVICE, AND RECORDING MEDIUM

CROSS REFERENCE TO RELATED APPLICATIONS

This application is based upon and claims the benefit of priority from the prior Japanese Patent Application No. 2012-181021, filed on Aug. 17, 2012, the entire contents of which are incorporated herein by reference.

FIELD

Embodiments of the present invention relate to an information handling device, an information output device, and an information handling program for transmitting and receiving device operating commands.

BACKGROUND

Recently, a new technique has been proposed, in which an information handling terminal such as smartphone, tablet, etc. is connected to a TV through an interface to operate the TV.

DETAILED DESCRIPTION

According to one embodiment, an information handling device has a first connection unit to establish a connection for acquiring a web application from a first communication device in order to receive the web application, a web application executing unit to generate a device operating command by executing the web application received from the first communication device through the first connection unit, a second connection unit to, when receiving a first authentication request from the web application, transmit a second authentication request to a second communication device, and establish a connection for receiving an authentication demander transmitted from the second communication device responding to the second authentication request in order to receive the authentication demander, an application authentication processing unit to generate a platform authenticator by encrypting the authentication demander received from the second communication device through the second connection unit based on a common key shared with the second communication device and key information inputted by a user, an application origin information attacher to attach origin information of the web application to the platform authenticator, and a third connection unit to establish a connection for transmitting the device operating command and the platform authenticator attached with the origin information to the second communication device in order to transmit the device operating command and the platform authenticator attached with the origin information.

Embodiments will now be explained with reference to the accompanying drawings.

First Embodiment

Figure 1:
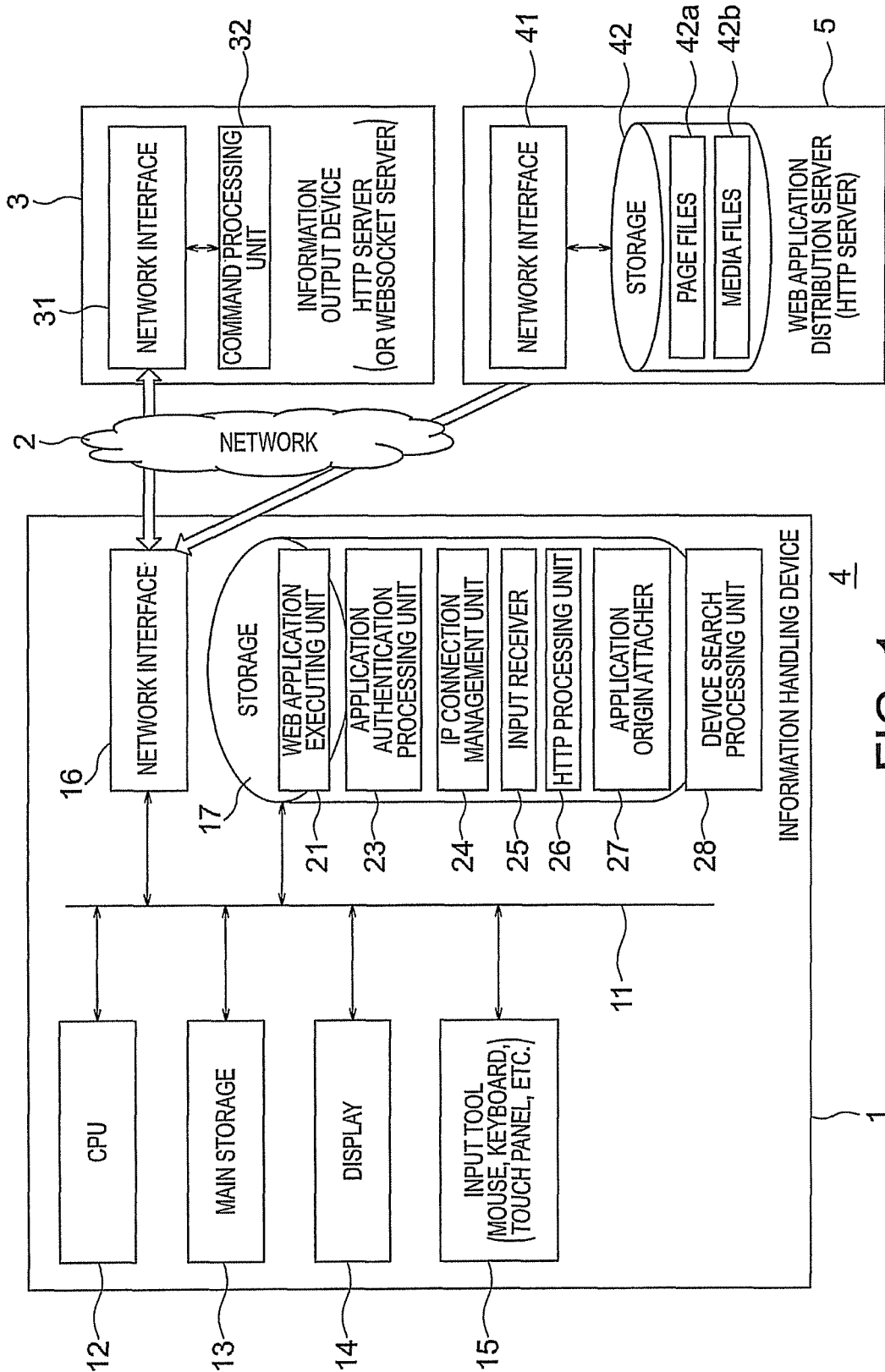
FIG. 1 is a block diagram showing an example of the whole configuration of an information processing system 4.

FIG. 1 is a block diagram showing an example of the whole configuration of an information processing system 4 for remotely operating an information output device (second communication device) 3 by transmitting a device operating command from an information handling device 1 through a network 2. The information processing system 4 of FIG. 1 has the information handling device 1 which receives a web application from a server and executes programs including a remote device operating command, the information output device 3 which displays video etc., and a Web application distribution server (first communication device) 5 which distributes an application. The information handling device 1 and the Web application distribution server 5 are connected through the network 2 such as the Internet, and the information handling device 1 and the information output device 3 are similarly connected through the network 2. Information is transmitted and received through network interfaces. Here, page files and media files constituting a web application are managed on a server (Web application distribution server 5), and their storage locations are specified by location identifiers called URLs (Uniform Resource Locators).

The information handling device 1 has a CPU 12, a main memory 13, a display 14, an input tool 15, a network interface 16, and a storage 17 each connected to a common bus 11. The input tool 15 is a tool such as mouse, keyboard, touch panel, etc. The storage 17 stores a web application and a platform application (hereinafter referred to as PF application). The Web application is executed by a Web application executing unit 21, and the PF application is executed by a PF application executing unit (application authentication processing unit 22). The Web application includes an IP connection management unit 24, an input receiver 25, an HTTP processing unit 26, and an application origin attacher 27 functioning as software modules.

The information output device 3 has a network interface 31, and a device operating command processing unit 32 which processing device operating commands transmitted from the information handling device 1.

The Web application distribution server 5 has a network interface 41 and a storage 42. The storage 42 stores page files 42a and media files 42b as mentioned later.

When executing a Web application with the information handling device 1, an application executing unit program providing the execution environment for the Web application should be executed beforehand. At this time, a shell program of the OS etc. executed by the CPU 12 of the information handling device 1 reads an application executing unit program from the storage in the information handling device 1, in accordance with e.g. a request from a user. Further, the CPU 12 stores the read application executing unit program in the main memory 13, and executes the application executing unit program.

The Web application is executed and started when the URL of a page file is specified by the user or program. At this time, the CPU 12 transmits, to the network interface 16, a command to acquire the page file of the specified URL. The network interface 16 is connected to the server of the specified URL, and issues a command to download the corresponding file.

The network interface 41 of the Web application distribution server 5 reads the corresponding file from the storage 42, and returns it to the information handling device 1. The network interface 16 of the information handling device 1 arranges the corresponding file in the main memory 13. The page file lists the URLs of media files used by the application. As in the case of the page file, the CPU 12 issues, to the network interface 16, a command to download these files, and arranges the downloaded files in the main memory 13 and the storage 17.

After the files necessary for executing the application are prepared, the application executing unit program converts the page file arranged in the main memory 13 or the storage 17 into a command which can be interpreted by the CPU 12, and the CPU 12 executes the command. Execution results are outputted on the display 14 of the information handling device 1 in accordance with the layout data included in the page file. The layout data includes a button (link) for displaying and executing another page file, together with the URL information of the page file. When the button is selected by e.g. a user request, the application executing unit program newly issues a request to download a page file, and a new page file is displayed and executed after the files (including media files) necessary for the page file are prepared.

Communication with an HTTP server or a WebSocket server is realized based on a protocol called the HTTP or WebSocket protocol using a script language called JavaScript (registered trademark) included in this page file etc. That is, when the Web application distribution server 5 provides operating functions based on HTTP or WebSocket, remote operation can be performed using a JavaScript program. Application developers can easily create a remote operation application using a Web application. At this time, there is a risk that remote operation is performed by an illegal Web application if no access control is performed by the Web application distribution server 5. Accordingly, URL information (Origin information) included in the WebSocket header or HTTP header is used as the information for identifying the Web application. When the information output device 3 performs access control using this URL information, only a Web application on a specific server is permitted to perform remote operation.

However, since the HTTP or WebSocket protocol is public information, there is no countermeasure when the execution environment (hereinafter, referred to as platform) of the Web application disguises the URL information of the HTTP or WebSocket protocol. Accordingly, any information should be used to notify the HTTP server or WebSocket server that the Web application is running on a genuine platform. This is because the URL information attached by a genuine platform is reliable. As a solution, the Web application may use a common key as the information to encrypt and transmit a device operating command, for example. However, how to store the common key becomes a problem since the page file of the Web application is described in plain text and thus confidential information cannot be stored therein.

As another technique, the Web application may be obfuscated to make it difficult to acquire the common key. However, since the Web application is finally converted into a format which can be interpreted by the browser, the common key can be acquired relatively easily, which leads to a problem of security strength.

As further another technique, the platform may encrypt the device operating command. However, this is inadvisable since major changes should be made in the existing browser so that the browser substantially serving as the platform is added with a function to encrypt the device operating command.

When remotely operating the information output device 3 using the HTTP or WebSocket protocol, the origin information (URL information) of the Web application requesting the operation may be used to perform access control. However, the URL information included in the header of the HTTP or WebSocket protocol may possibly be unreliable.

This is because the specifications of the HTTP or WebSocket protocol are released to the public, which makes it relatively easy to develop a platform (fake browser) to transmit feigned URL information.

In order to perform access control correctly, it is required to guarantee the information output device 3 that the Web application requesting operation is running on a genuine platform and the URL information is reliable.

In view of the above aspects, the information processing system 4 of FIG. 1 is designed to guarantee the information output device 3 that the URL information of the Web application executed by the information handling device 1 is reliable.

Figure 2:
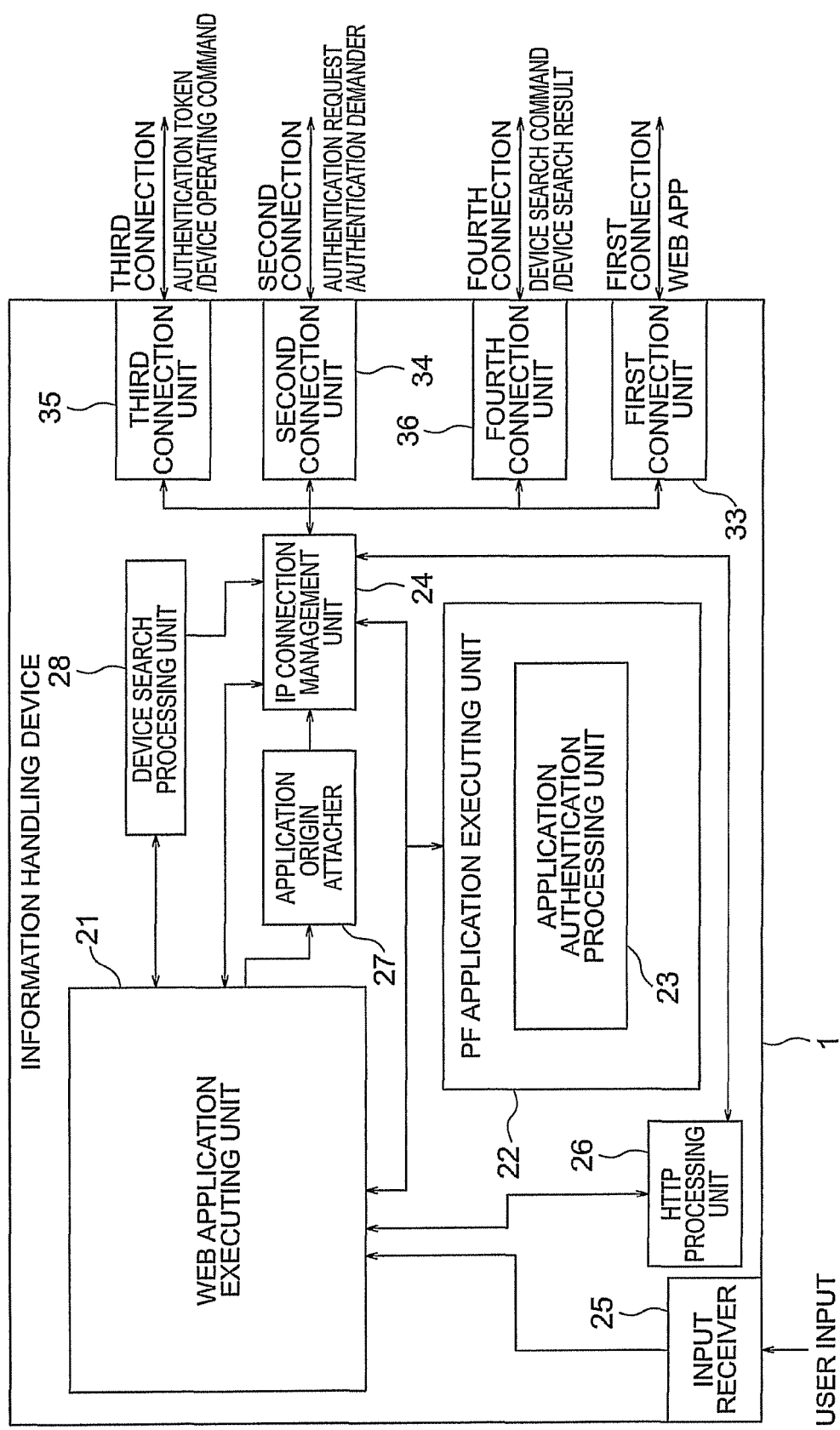
FIG. 2 is a block diagram showing an information handling device 1 according to a first embodiment.

FIG. 2 is a block diagram showing the internal configuration of the information handling device 1 according to a first embodiment. The information handling device 1 of FIG. 2 has the Web application executing unit 21 which executes a Web application, a PF application executing unit 22 which executes a PF application, an application authentication processing unit 23 provided in the PF application executing unit 22, the IP connection management unit 24 which performs control to transmit a device operating command and an authentication token (platform authenticator) to the information output device 3, the input receiver 25 which receives user input, the HTTP processing unit 26 which acquires a Web application from the Web application distribution server 5, the application origin attacher 27 which attaches the origin information of the Web application to the authentication token, a device search processing unit 28 which searches the information output device 3, a first connection unit 33 which establishes a first connection for acquiring a web application to receive the web application, a second connection unit 34 which establishes a second connection with the information output device 3 to transmit an authentication request (a second authentication request) and receive an authentication demander, a third connection unit 35 which establishes a third connection with the information output device 3 to transmit the device operating command and the platform authenticator attached with the origin information, and a fourth connection unit 36 which establishes a fourth connection for performing a device search to transmit a device search command and receive a search result.

The application authentication processing unit 23 generates an authenticator (authentication token) guaranteeing that the Web application is running on a genuine platform.

The Web application executing unit 21 functions as a browser providing the execution environment for a Web application running on the browser. The PF application executed by the PF application executing unit 22 is a native application created in a command format which can be directly executed by a computing machine. On the other hand, the Web application is generated using an HTML or JavaScript files generally described in plain text and various media files used by these files.

The Web application executed by the Web application executing unit 21 and the PF application executed by the PF application executing unit 22 can be developed separately, but it is difficult to add new functions to the Web application executing unit 21 since its mechanism is generally complicated. When realizing a certain unique function, it is desirable to realize the objective function by the application authentication processing unit 23, which requires lower development cost than changing the internal mechanisms of the browser. Further, secret information can be protected more securely by the PF application made as a native application, while it is difficult to embed the secret information in HTML or JavaScript serving as the description language of the Web application.

On the other hand, the PF application basically cannot operate the internal data of the browser (e.g., connection data, communicate data, etc.) and can operate the internal data of the browser only when an externally-operable interface for the browser is not released to the public, which lowers the degree of freedom.

The Web application executing unit 21 acquires, executes, and displays a Web application described in HTML or JavaScript and media files of moving images and sounds referred to by the Web application. When the Web application executing unit 21 receives an application execution request from the input receiver 25 receiving a user input or from an authentication requester (mentioned later), the Web application executing unit 21 requests the HTTP processing unit 26 to acquire the Web application and starts executing the acquired Web application.

Further, when a remote device operating command is included in, e.g., a JavaScript program of the Web application, the Web application executing unit 21 send an authentication request (a first authentication request) for the application authentication processing unit 23 to acquire an authenticator (authentication token) for guaranteeing that the application is executed on a legitimate platform. The application authentication processing unit 23 acquires the authentication token and passes it to the application origin attacher 27 together with the information for identifying the location of the information output device 3 (e.g., Fully Qualified Domain Name (FQDN), IP address, etc.). The application origin attacher 27 attaches the location identifier of the application origin (e.g., URL information or Origin information) to the authentication token. Here, the Origin information shows domain part of the URL. For example, when an application is acquired from http://www.toshiba-.com/application_1/, its Origin is www.toshiba.com.

The application origin attacher 27 instructs the IP connection management unit 24 to transmit the authentication token attached with the location identifier of the application origin to the information output device 3 using the third connection unit 35 for managing the connection with the information output device 3. The IP connection management unit 24 instructs the third connection unit 35 to establish the third connection for transmitting the authentication token. The third connection unit 35 establishes the third connection, and then transmits the authentication token to the information output device 3. In this way, the information output device 3 can determine that the third connection through which the authentication token is transmitted is a connection established by a legitimate platform. Further, the information output device 3 can also determine that the application origin is attached by the legitimate platform. Once an authentication token is transmitted to the information output device 3, the same authentication token transmitted to the information output device 3 again through another connection leads to invalid authentication (one-time password). This can improve information security.

Further, the Web application executing unit 21 generates a device operating command, and asks the IP connection management unit 24 to transmit the device operating command utilizing the third connection unit 35. Accordingly, the IP connection management unit 24 transmits the device operating command to the information output device 3 utilizing the third connection unit 35. Since the authentication token has already been transmitted to the information output device 3 by the third connection unit 35, the information output device 3 can determine that the third connection is established by a legitimate platform. Thus, the information output device 3 can judge that the device operating command transmitted through the same connection is also transmitted from an application running on the legitimate platform, and can determine the origin of the application correctly.

Upon receiving a request to generate an authentication token from the Web application executing unit 21, the application authentication processing unit 23 generates an authentication token and passes it to the Web application executing unit 21. In order that the information output device 3 verifies the operating platform is legitimate, authentication should be performed between the information output device 3 and the application authentication processing unit 23. Accordingly, when the second connection is not established with the information output device 3, the application authentication processing unit 23 requests the second connection unit 34 to establish the second connection through the IP connection management unit 24, to request authentication through the established connection. As the authentication method, a generally known method such as password authentication, challenge and response authentication, etc. should be used. For example, when utilizing challenge and response authentication as the authentication method, the application authentication processing unit 23 specifies the second connection unit 34 through the IP connection management unit 24, transmits an authentication request through the second connection, receives from the information output device 3 a challenge serving as an authentication demander, generates a response, and passes it to the Web application executing unit 21 as an authenticator (authentication token). Then, the Web application executing unit 21 specifies the third connection unit 35 and the IP connection management unit 24 transmits the response. The authentication is completed at this point. Further, when using a normal password authentication, the application authentication processing unit 23 specifies the second connection unit 34, transmits a password through the IP connection management unit 24 to the information output device 3, receives a random character string from the information output device 3 as an authentication result, and passes it to the Web application executing unit 21. Then, the Web application executing unit 21 specifies the third connection unit 35 and transmits the character string through the IP connection management unit 24. If the character string transmitted from the information output device 3 and the character string received by the information output device 3 correspond to each other, the third connection is certified to be legal.

In this way, the second connection and the third connection are separated. By using the second connection to transmit, to the information output device 3, the information to be concealed from the Web application or the information not to be falsified, the Web application can access only the data transmitted and received through the first connection, which makes it possible to conceal the information and prevent the information from being falsified.

The IP connection management unit 24 identifies a plurality of connection units including the first to fourth connection units 33 to 36, and transmits data utilizing the connection unit specified by the caller of the IP connection management unit 24.

The first connection unit 33 called by the IP connection management unit 24 receives, from the IP connection management unit 24, location information of the specified Web application distribution server and application, establishes the first connection with the Web application distribution server 5, acquires the Web application, and returns it to the IP connection management unit 24.

The second connection unit 34 called by the IP connection management unit 24 receives, from the IP connection management unit 24, location information of the specified information output device 3, establishes the second connection (if not established yet), transmits an authentication request to the information output device 3, receives an authentication demander from the information output device 3, and returns it to the IP connection management unit 24.

The third connection unit 35 called by the IP connection management unit 24 receives, from the IP connection management unit 24, location information of the specified information output device 3, establishes the third connection (if not established yet), and transmits the authentication token device operating command passed by the IP connection management unit 24.

The fourth connection unit 36 called by the IP connection management unit 24 receives, from the IP connection management unit 24, a device search command, establishes the fourth connection, transmits the device search command, receives a device search result, and returns it to the IP connection management unit 24.

Figure 3:
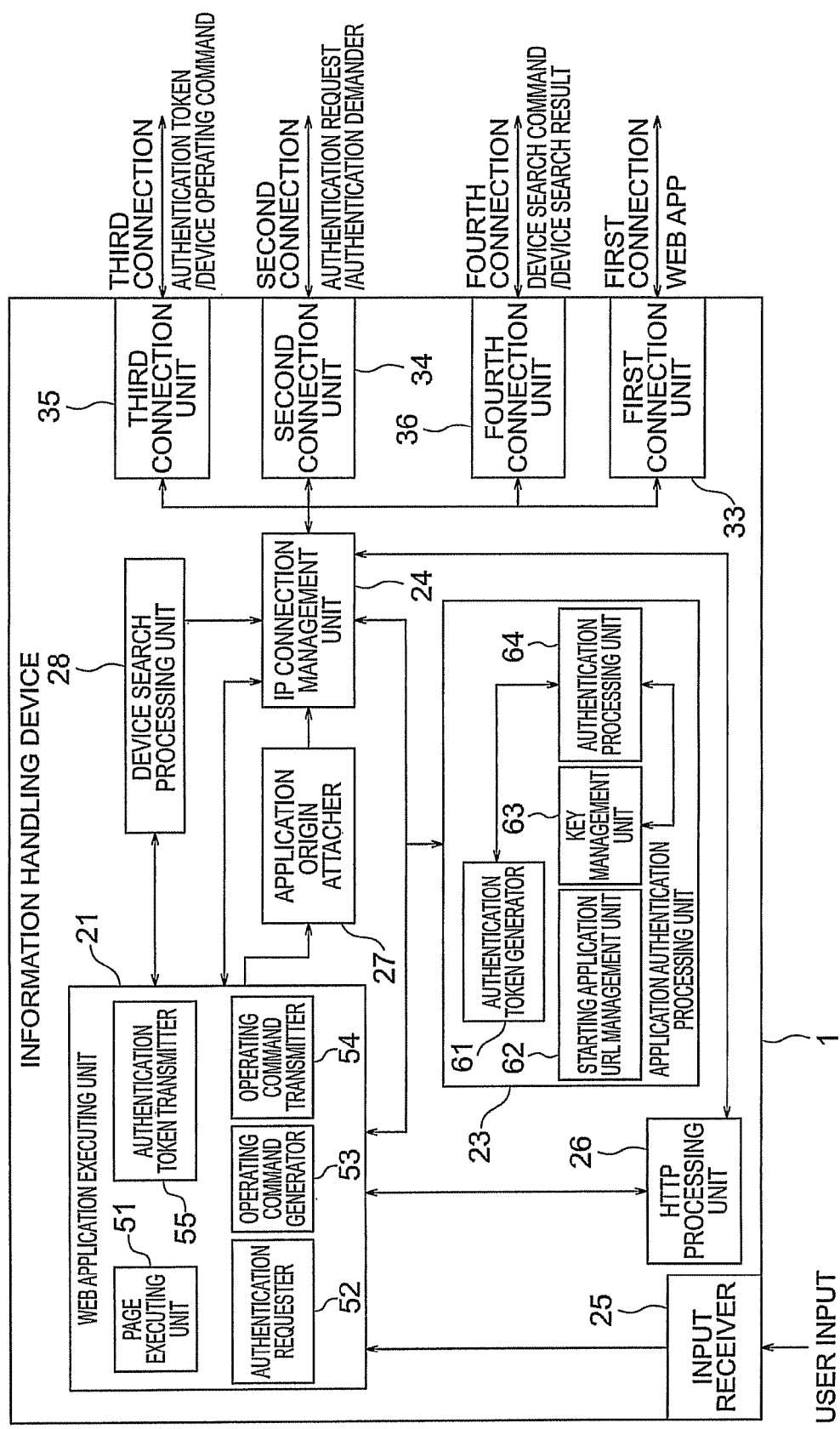
FIG. 3 is a block diagram showing a Web application executing unit 21 and an application authentication processing unit 23.

FIG. 3 is a block diagram showing the internal configurations of the Web application executing unit 21 and the application authentication processing unit 23 in the information handling device 1 of FIG. 2. In FIG. 3, the PF application executing unit 22 is omitted, but the application authentication processing unit 23 is provided within the PF application executing unit 22, similarly to FIG. 2. Hereinafter, the configuration of the information handling device will be explained in detail using FIG. 3.

The Web application executing unit 21 has a page executing unit 51 (so-called a Web browser) which displays and executes a Web application, an authentication requester 52 which requests an authenticator (authentication token) for certifying that the Web application is running on a legitimate platform through the Web application itself, an operating command generator 53 which generates a remote device operating command, an operating command transmitter 54 which transmits a device operating command, and an authentication token transmitter 55 which transmits an authentication token.

The components excepting the page executing unit 51 serving as a Web browser, that is, the authentication requester 52, the operating command generator 53, the operating command transmitter 54 and the authentication token transmitter 55 are software modules in the Web application.

The application authentication processing unit 23 has an authentication token generator 61 which generates an authentication token for certifying that the platform is genuine, a starting application URL management unit 62 which manages the URL of the page to be displayed first by the application, a key management unit 63 which manages keys for generating an authentication token, and an authentication processing unit 64 which transmits an authentication request to the HTTP server or WebSocket server.

Since the application authentication processing unit 23 and the Web application executing unit 21 are separated, the authentication token for guaranteeing the validity of the platform can be safely generated without storing secret information in the Web application executing unit 21.

The page executing unit 51 in the Web application executing unit 21 receives a request to start a Web application and its start location information (start URL information) from the input receiver 25 and the starting application URL management unit 62, and executes the Web application. Upon receiving the start request, the page executing unit 51 passes the start URL information to the HTTP processing unit 26 to acquire the Web application. Further, the page executing unit 51 executes the Web application based on the processes described in the acquired Web application. When an authentication request is included in the Web application, the page executing unit 51 calls the authentication requester 52 specifying the location information of the information output device 3 (e.g., IP address) to acquire an authentication token, and calls the authentication token transmitter 55 to pass the authentication token acquired by the authentication requester 52 to the authentication token transmitter 55. Further, when an operating request is included in the Web application, the page executing unit 51 calls the operating command generator 53 specifying the identifier of the device operating command to generate a device operating command, and calls the operating command transmitter 54 specifying the device operating command. Further, the page executing unit 51 passes the origin location information of the application being executed to the application origin attacher 27 in accordance with a request therefrom.

The authentication requester 52 receives the location information of the information output device 3 from the page executing unit 51, and calls the authentication token generator 61 of the application authentication processing unit 23. Further, the authentication requester 52 receives an authenticator (authentication token) from the authentication token generator 61, and passes it to the page executing unit 51. When multiply encrypting the authenticator as mentioned later, the password inputted by the user may be passed to the authentication token generator 61.

The authentication token transmitter 55 receives the authentication token and the location information of the information output device 3 from the page executing unit 51, and calls the application origin attacher 27 to pass the authentication token and the location information of the information output device 3 to the application origin attacher 27. Further, the authentication token transmitter 55 receives the identifier of the connection unit (third connection unit 35) from the application origin attacher 27, and stores it in the main memory 13 etc.

The operating command generator 53 receives the type of the device operating command from the page executing unit 51, generates a device operating command in a specific format, and passes it to the page executing unit 51. The details of this format are not questioned as long as the format is previously arranged between the information output device 3 and the operating command generator 53.

The operating command transmitter 54 receives the device operating command from the page executing unit 51, acquires the identifier of the connection unit stored by the authentication token transmitter 55 in the main memory 13 etc., and calls the IP connection management unit 24 to pass the device operating command to the IP connection management unit 24 as a transmission message while specifying the third connection unit 35 as its transmission destination. The device operating command can be transmitted a plurality of times without retransmitting the authentication token, until this connection is disconnected.

The application origin attacher 27 receives the authentication token and the location information of the information output device 3 from the authentication token transmitter 55, acquires the origin location information (URL information) of the application from the page executing unit 51, and attaches it to the authentication token. Further, the application origin attacher 27 calls the IP connection management unit 24 to pass the authentication token attached with the application origin information to the IP connection management unit 24 as a transmission message while specifying the location information of the information output device 3 as its transmission destination. The application origin attacher 27 makes it possible for the information output device 3 to grasp which application issued the device operating command.

The authentication token generator 61 receives, from the authentication requester 52 of the Web application executing unit 21, the authentication request together with the location information of the information output device 3, and asks the IP connection management unit 24 to establish the second connection for authentication if this connection is not established yet. That is, the authentication token generator 61 calls the second connection unit 34 to pass the authentication request command to the second connection unit 34 as a transmission message while specifying the location information of the information output device 3 as its transmission destination, in order to request the second connection unit 34 to establish the second connection. When the second connection has already been established, the authentication token generator 61 transmits only the authentication request message. Further, the authentication token generator 61 receives, from the IP connection management unit 24, the establishment result of the connection (only when establishing the connection) and a message from the authentication partner, passes them to the application authentication processing unit 23 to request the application authentication processing unit 23 to perform authentication, and passes the result to the authentication requester 52. For example, in the case of challenge and response authentication, the authentication token generator 61 receives, from the IP connection management unit 24, a challenge as a response to the authentication request command, passes it to the application authentication processing unit 23, receives a response from the application authentication processing unit 23, and returns it to the authentication requester 52 as an authentication token. When the authentication token generator 61 receives a password from the authentication requester 52, the authentication token generator 61 passes the received password to the application authentication processing unit 23 when requesting the application authentication processing unit 23 to perform authentication.

The application authentication processing unit 23 receives, from the authentication token generator 61, the authentication request together with the message received from the authentication partner, transmits a key acquisition command to the key management unit 63, and generates an authentication token based on the key received from the key management unit 63 and the message from the authentication partner. For example, in the case of challenge and response authentication, a response is generated based on the message (challenge) received from the authentication partner and the key, using a method such as HMAC-SHA1, HMAC-MD5, etc. The application authentication processing unit 23 passes this response to the authentication token generator 61 as an authentication token. Before generating this response, the challenge may be encrypted with another key. That is, the response may be multiply encrypted. As this key, a password inputted by the user may be utilized, for example. This password is transmitted from the authentication requester 52. As an encryption method, a generally known method such as common key encryption system based on AES, XOR operation, etc., should be used. Further, a key for generating a response may be encrypted with a password inputted by the user to generate a response with the encrypted key, or the generated response may be further encrypted with a password inputted by the user.

The key management unit 63 receives a key acquisition request from the application authentication processing unit 23, and passes a key thereto. This key to be acquired is stored in a location which is hardly or cannot be read by the units other than the key management unit 63.

When an application is started, the starting application URL management unit 62 reads start URL information from a secondary storage etc., and passes it to the page executing unit 51 to request the page executing unit 51 to start the Web application.

The IP connection management unit 24 establishes a connection with the server using a communication protocol such as WebSocket protocol and HTTP, to transmit and receive data. The IP connection management unit 24 specifies the transmission destination server by receiving its location identifier (FQDN information or IP address information) or identifier information of a connection already established. When the location identifier is specified, the IP connection management unit 24 establishes a connection with the corresponding server first, based on the location identifier information. After that, the IP connection management unit 24 transmits a transmission message specified by the caller using the established connection when a location identifier is specified or using the specified connection when receiving the identifier information of an already established connection. Further, the IP connection management unit 24 receives a response from the server, and returns it to the caller together with connection information. The IP connection management unit 24 can transmit an authentication token and a device operating command through the third connection unit 35, and transmit an authentication request through the second connection unit 34. Further, the IP connection management unit 24 manages the first connection unit 33 for acquiring an application.

Accordingly, the IP connection management unit 24 is characterized in capable of simultaneously managing a plurality of connection units and distinguishing the connection unit to be utilized by the caller or connection identifier.

Further, when the connection is disconnected or failed, the IP connection management unit 24 may determine the connection unit suffering from the disconnection or connection failure, and determine the block which requested to establish the connection unit in order to return an error thereto. In addition, when the information handling device 1 has the device search processing unit 28 (mentioned later), the IP connection management unit 24 separately manages the fourth connection unit 36 which manages the fourth connection for device search.

The device search processing unit 28 receives a search command from the information output device 3, generates a device search command, searches the information output device 3 using the IP connection management unit 24 and the fourth connection unit 36 called by the IP connection management unit 24, and returns a list of the location identifiers of the found information output devices 3. A generally known protocol such as UPnP, NetBIOS, etc. should be used for this device search. When the Web application executing unit 21 previously recognizes the location identifier of the information output device 3, the device search processing unit 28 is not necessarily essential. By providing the device search processing unit 28, there is no need to previously set, in the operating device, information about which operation target devices are provided in the network 2. When the device search processing unit 28 is not provided, the fourth connection unit 36 is not essential.

The application authentication processing unit 23 transmits and receives the authentication request and authentication token to and from the information output device 3 through the second connection unit 34, using the location identifier of the information output device 3 acquired by the device search processing unit 28.

The input receiver 25 receives a user input, and passes the input information to the page executing unit 51, depending on the type of input. For example, when a link included in a page is selected by an external input device such as mouse, keyboard, etc., the input receiver 25 notifies the page executing unit 51 about the selection information, and the page executing unit 51 acquires and executes the linked page, based on the received selection information.

The HTTP processing unit 26 receives a server data acquisition request together with the location identifier (URL information) of the data to be acquired, and gets connected to the server corresponding to the URL information through the IP connection management unit 24 and the first connection unit 33 to acquire the data. The HTTP processing unit 26 passes received data to the data acquisition requester.

Figure 4:
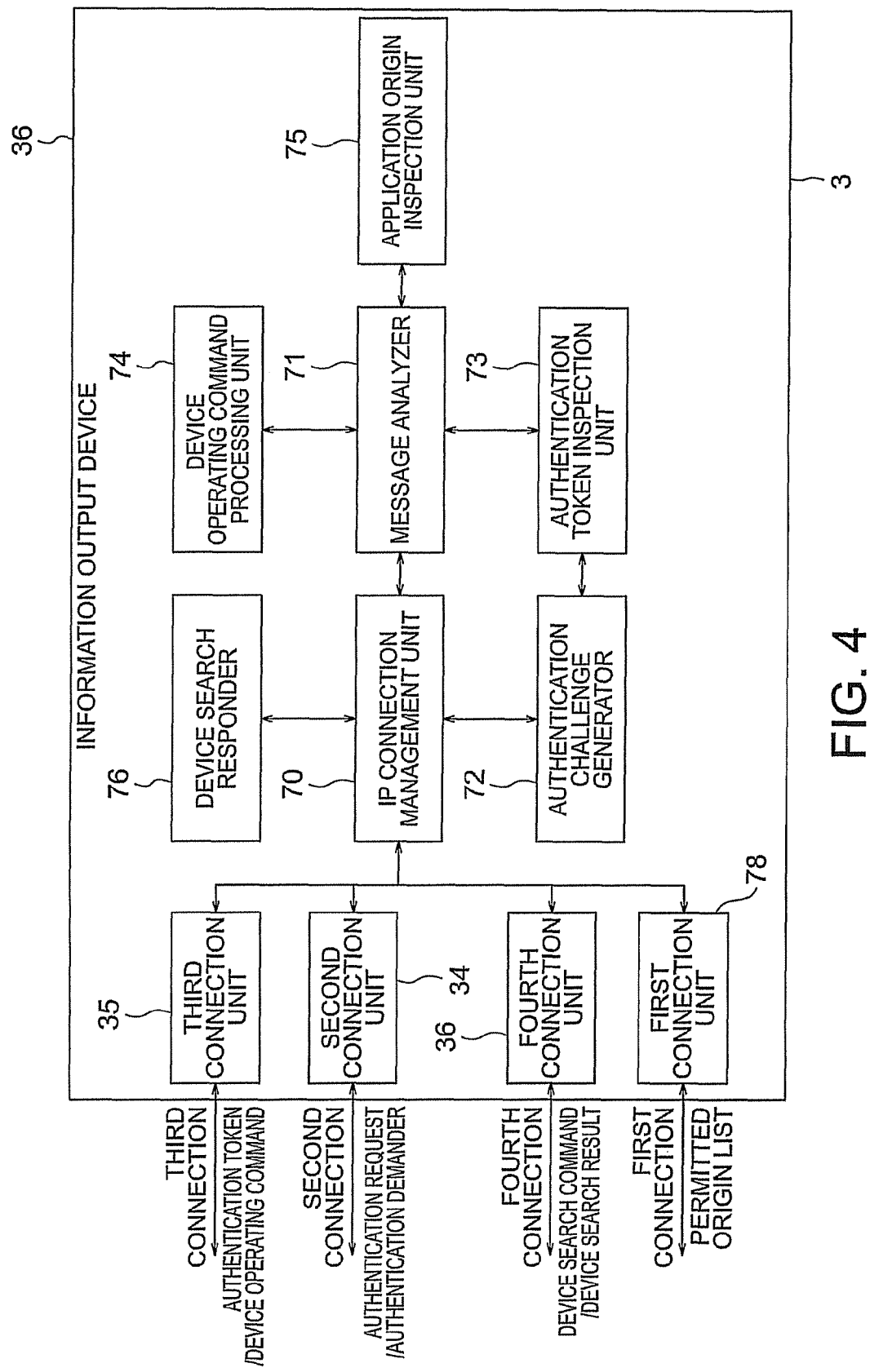
FIG. 4 is a block diagram showing an information output device 3 according to the first embodiment.

FIG. 4 is a block diagram showing the internal configuration of the information output device 3 according to the first embodiment. The information output device 3 of FIG. 4 has an IP connection management unit 70, a message analyzer 71, an authentication challenge generator 72, an authentication token inspection unit 73, a device operating command processing unit 74, an application origin inspection unit 75, a device search responder 76, and first to fourth connection units 78 and 34 to 36. In this specification, the second to fourth connection units 34 to 36 in the information handling device 1 and the second to fourth connection units 34 to 36 in the information handling device 1 are assigned with the same symbols. That is, a connection is established between the connection units assigned with the same symbol.

The IP connection management unit 70 establishes a connection with the information handling device 1 using a communication protocol such as WebSocket protocol and HTTP, to transmit and receive data. The IP connection management unit 70 separately manages the second connection unit 34 and the third connection unit 35. The IP connection management unit 70 uses the third connection unit 35 to receive an authentication token, origin information, and a device operating command, and uses the second connection unit 34 to receive an authentication request and to transmit an authentication challenge as an authentication demander. Accordingly, the IP connection management unit 70 is characterized in that it is possible to simultaneously manage a plurality of connection units and distinguish the connection unit to be utilized by the caller or connection identifier. In addition, when the information output device 3 has the device search responder (mentioned later), the IP connection management unit 70 separately manages the fourth connection unit 36 which establishes the connection for device search, receives a search command, and transmits a response to the search command. Further, the IP connection management unit 70 may separately manage the first connection unit 78 which acquires a permitted origin list.

The message analyzer 71 splits the command received through the third connection unit 35 into a device operating command, an authentication token, and origin information. The message analyzer 71 passes the authentication token to the authentication token inspection unit 73, and passes the origin information to the application origin inspection unit 75. The message analyzer 71 passes the device operating command to the device operating command processing unit 74 only when judging that the inspection results of the origin information and authentication token received from the application origin inspection unit 75 and authentication token inspection unit 73 are appropriate.

When receiving an authentication request from the IP connection management unit 70 through the second connection unit 34, the authentication challenge generator 72 generates an authentication challenge and returns it to its requester through the second connection unit 34. A random character string may be generated as this challenge. Further, the IP connection management unit 70 generates a response to the authentication challenge using key information (common key) stored in the information output device 3, and stores it as authentication token verifying information.

The authentication token inspection unit 73 inspects the authentication token passed through the second connection unit 34. The authentication token inspection unit 73 checks whether the passed authentication token exists in the authentication token verifying information stored in the authentication challenge generator 72. If exists, the authentication token inspection unit 73 returns a result indicating that the authentication token is appropriate, and if not exists, the authentication token inspection unit 73 returns a result indicating that the authentication token is inappropriate.

When the authentication token is appropriate, the authentication token inspection unit 73 eliminates the stored authentication token verifying information. In this way, a password effective in only one-time authentication (one-time password) can be generated.

The device operating command processing unit 74 processes the device operating command received from the information handling device 1, controls a tuner (not shown), and transmits an instruction for switching the video etc. to be displayed on a screen output unit (not shown).

The application origin inspection unit 75 analyzes header information when establishing the third connection, judges the origin of the application which requested to establish the connection, and judges whether the origin is included in a permitted origin list. If included, the application origin inspection unit 75 returns a result indicating that the origin is appropriate, and if not included, the application origin inspection unit 75 returns a result indicating that the origin is inappropriate. Here, the permitted origin list shows the origins of Web applications each capable of issuing an authentication token. This list is provided corresponding to each Web application. The permitted origin list is managed by the Web application distribution server 5, for example.

The device search responder 76 returns the name or IP address of the information output device 3 responding to a device search request from the information handling device 1 (mentioned later). The device may be searched using a protocol based on the UPnP standard, or using a name search method based on NetBIOS. Note that the device search responder 76 is not essential.

Figure 5:
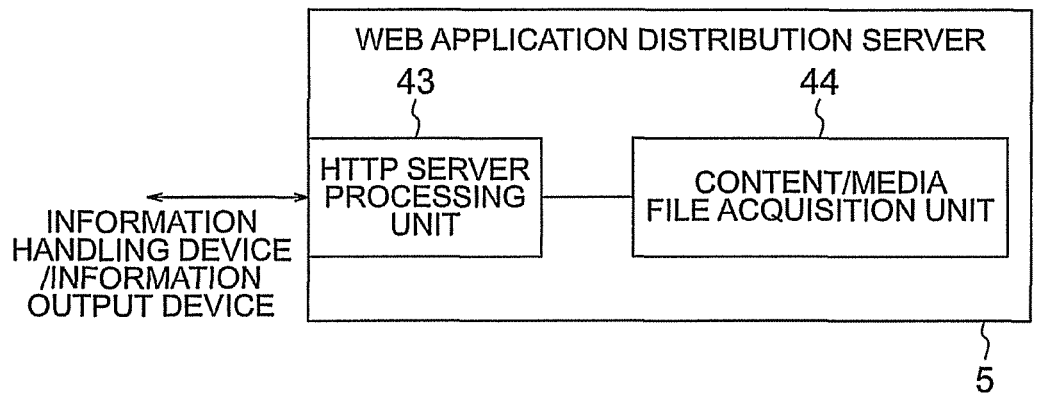
FIG. 5 is a block diagram showing a Web application distribution server 5 according to the first embodiment.

FIG. 5 is a block diagram showing the internal configuration of the Web application distribution server 5 according to the first embodiment. The information output device 3 of FIG. 5 has an HTTP server processing unit 43 and a content/media file acquisition unit 44. The HTTP server processing unit 43 includes the network interface 41 shown in FIG. 1, and the content/media file acquisition unit 44 includes the storage 42 shown in FIG. 1.

The HTTP server processing unit 43 receives URL information from the information handling device 1, passes it to the content/media file acquisition unit 44 to request the content/media file acquisition unit 44 to acquire the file, receives the file, and passes it to the information handling device 1.

The content/media file acquisition unit 44 converts the URL information passed by the HTTP server processing unit 43 into the file location in the storage (not shown) of the Web application distribution server 5, reads the file from the storage, and passes it to the HTTP server processing unit 43.

Figure 6:
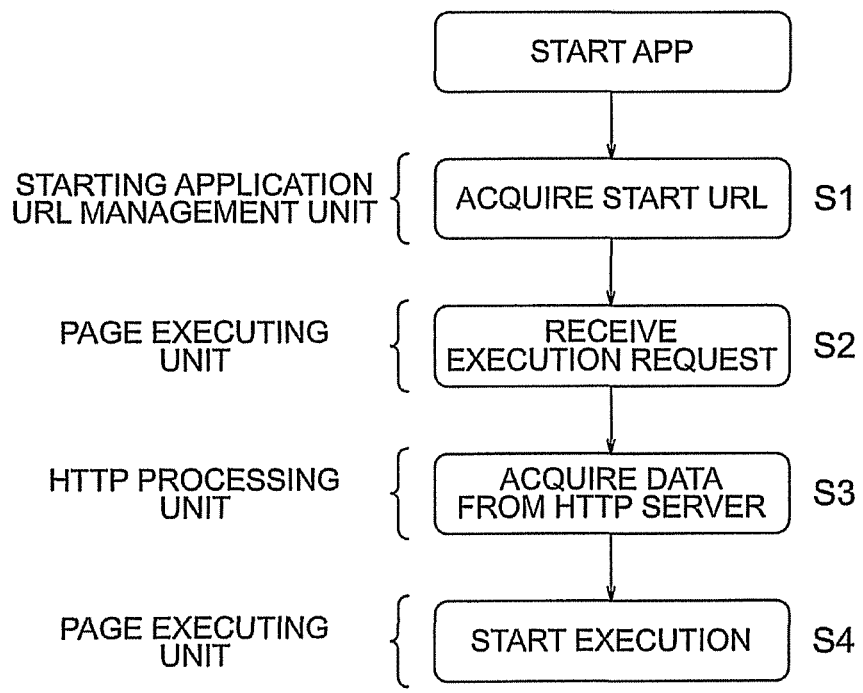
FIG. 6 is a flow chart showing an example of the processing steps performed by the Web application executing unit 21 and the application authentication processing unit 23 at the time of start.

FIG. 6 is a flow chart showing an example of the processing steps performed by the Web application executing unit 21 and application authentication processing unit 23 in the information handling device 1 at the time of start. At the time of start, the page to be displayed first is acquired from the Web application distribution server 5 and executed. The start page is set corresponding to each application (device). Details will be explained below.

The starting application URL management unit 62 in the application authentication processing unit 23 loads, from a region in the storage etc. managed by the starting application URL management unit 62, URL information of the page to be displayed first when the application is started, and passes the URL information to the page executing unit 51 to request the page executing unit 51 to display the page (Step S1).

The page executing unit 51 receives the URL information, and requests the HTTP processing unit 26 to acquire the page data indicated by the URL information (Step S2).

The HTTP processing unit 26 gets connected to the server indicated by the URL, transmits a page acquisition command based on the URL information, acquires page data, and returns the data to the page executing unit 51 (Step S3). The page executing unit 51 starts executing the Web application based on the acquired (Step S4).

When the URL information to be managed is changed corresponding to each information handling device 1, page data acquired from the server changes, which means that the process to be performed can be changed. For example, a channel changer application (device) and a record viewer application (device) can be realized as separate applications.

When an authentication request command appears while the Web application is executed, the authentication connection (second connection) for the authentication token regarding the validity of the platform is established, and the device operating connection (third connection) is established with the information output device 3.

Figure 7:
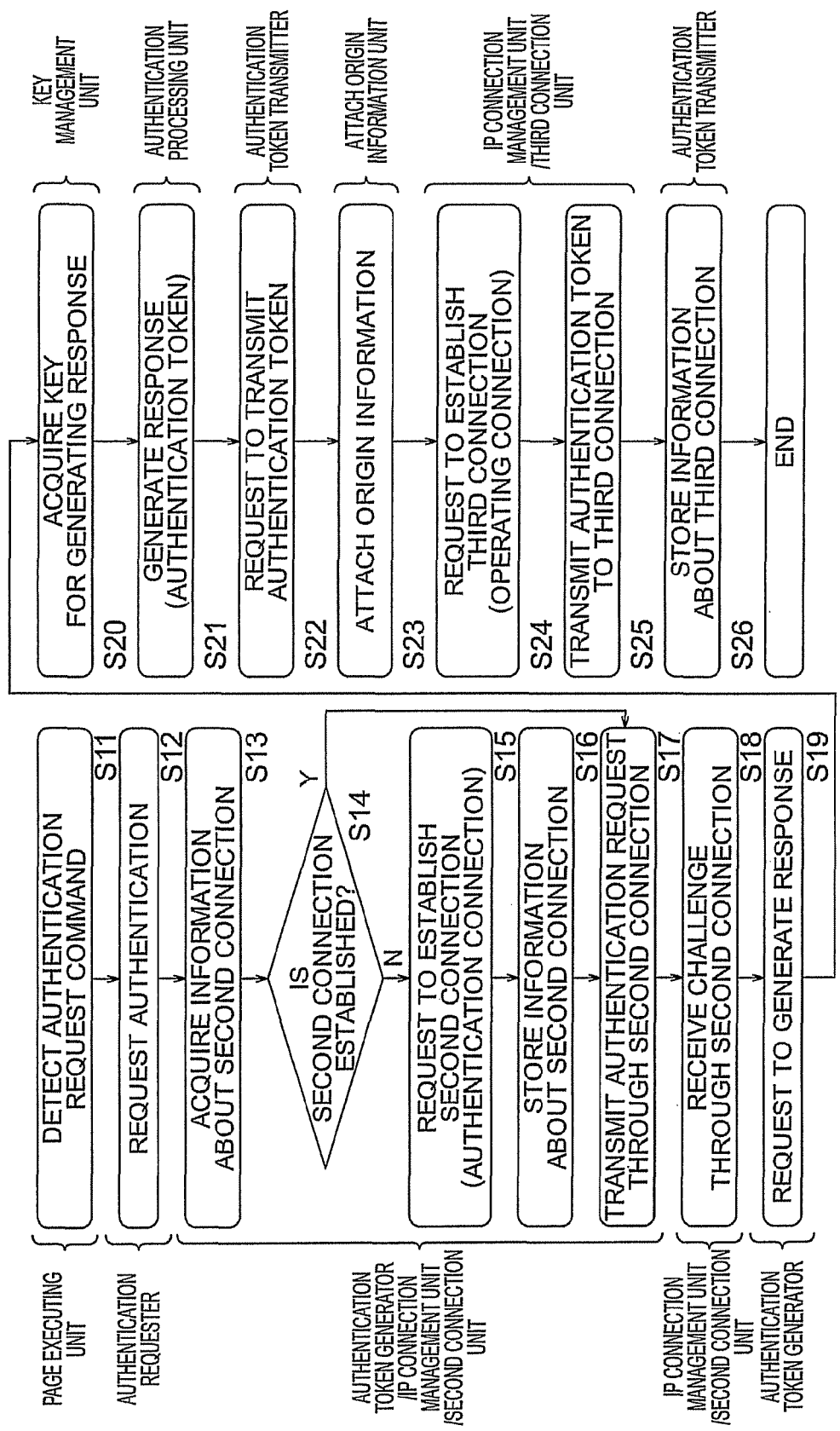
FIG. 7 is a flow chart showing an example of the processing steps when an authentication request command is detected.

FIG. 7 is a flow chart showing an example of the processing steps when an authentication request command is detected, in the case of challenge and response authentication.

When the page executing unit 51 detects an authentication request command while a Web application is executed (Step S11), the page executing unit 51 passes the location information of the information output device 3 to the authentication requester 52 to request authentication. At this time, the page executing unit 51 may request the user to input a password and pass the received password to the authentication requester 52. Next, the authentication requester 52 passes the password (if received) and the location information of the information output device 3 to the authentication token generator 61 to request the authentication token generator 61 to generate an authentication token (Step S12).

The authentication token generator 61 acquires the information about the second connection unit 34 (Step S13), and checks whether the second connection has already been established (Step S14). If not established yet, the authentication token generator 61 requests the IP connection management unit 24 to establish a connection (authentication connection, second connection) with the information output device 3, using the location information of the information output device 3 (Step S15). The IP connection management unit 24 establishes the second connection with the information output device 3 using the second connection unit 34. After the second connection is establishment, the authentication token generator 61 stores the identifier information of the second connection unit 34 in the main memory 13 etc. (Step S16).

When Step S16 is completed or the second connection has already been established, the IP connection management unit 24 transmits an authentication request to the information output device 3 through the second connection unit 34 (Step S17).

The IP connection management unit 24 receives a challenge from the information output device 3 through the second connection unit 34 (Step S18), and the second connection unit 34 returns the challenge to the authentication token generator 61. At this time, the establishment of the second connection may be cancelled. Next, the authentication token generator 61 passes the received challenge to the application authentication processing unit 23 to generate a response request (Step S19).

The application authentication processing unit 23 receives the challenge from the information output device 3, and requests the key management unit 63 to acquire a key for generating a response. In accordance with the request from the application authentication processing unit 23, the key management unit 63 acquires a key from the storage etc., and returns the key to the application authentication processing unit 23 (Step S20). After that, the application authentication processing unit 23 generates a response based on the challenge and the acquired key, and returns it to the authentication token generator 61 (Step S21). As an algorithm for generating the response, a generally known method such as HMAC-SHA1, HMAC-MD5, etc. should be used. At this time, the challenge, response, or key used to generate the challenge may be further encrypted with a password received from the page executing unit 51.

Responding to the authentication requester 52, the authentication token generator 61 returns an authentication token to the authentication token transmitter 55. At this time, the authentication token generator 61 asks the authentication token transmitter 55 to transmit the authentication token as a transmission message while specifying the location information of the information output device 3 as its destination information (Step S22).

The authentication token transmitter 55 passes the connection establishment request to the application origin attacher together with the authentication token. The application origin attacher acquires the origin location information (URL information) of the application from the page executing unit 51, attaches it to transmit data (Step S23), and passes the transmit data and destination information to the IP connection management unit 24.

Based on the destination information, the IP connection management unit 24 establishes the third connection (operating connection) with the information output device 3 through the third connection unit 35 (Step S24).

After that, the IP connection management unit 24 transmits the authentication token to the information output device 3 through the third connection unit 35 (Step S25), and returns the identifier information of the third connection unit 35 to the authentication token transmitter 55. In the last, the authentication token transmitter 55 receives the identifier information of the third connection unit 35 and stores it in the main memory 13 etc (Step S26). As long as the third connection is not disconnected, the device operating command can be transmitted again and again using the third connection unit 35.

The third connection is disconnected when the page executing unit 51 starts executing (shifts to) another page in the case of WebSocket protocol, or when the Web application itself explicitly disconnects the connection. In this case, the authentication process shown in FIG. 7 is performed again. In the case of HTTP, the connection is generally disconnected for each communication, and thus the authentication token and device operating command are simultaneously transmitted.

When a device operating command appears while the Web application is executed, the device operating command is transmitted through the third connection unit 35.

Figure 8:
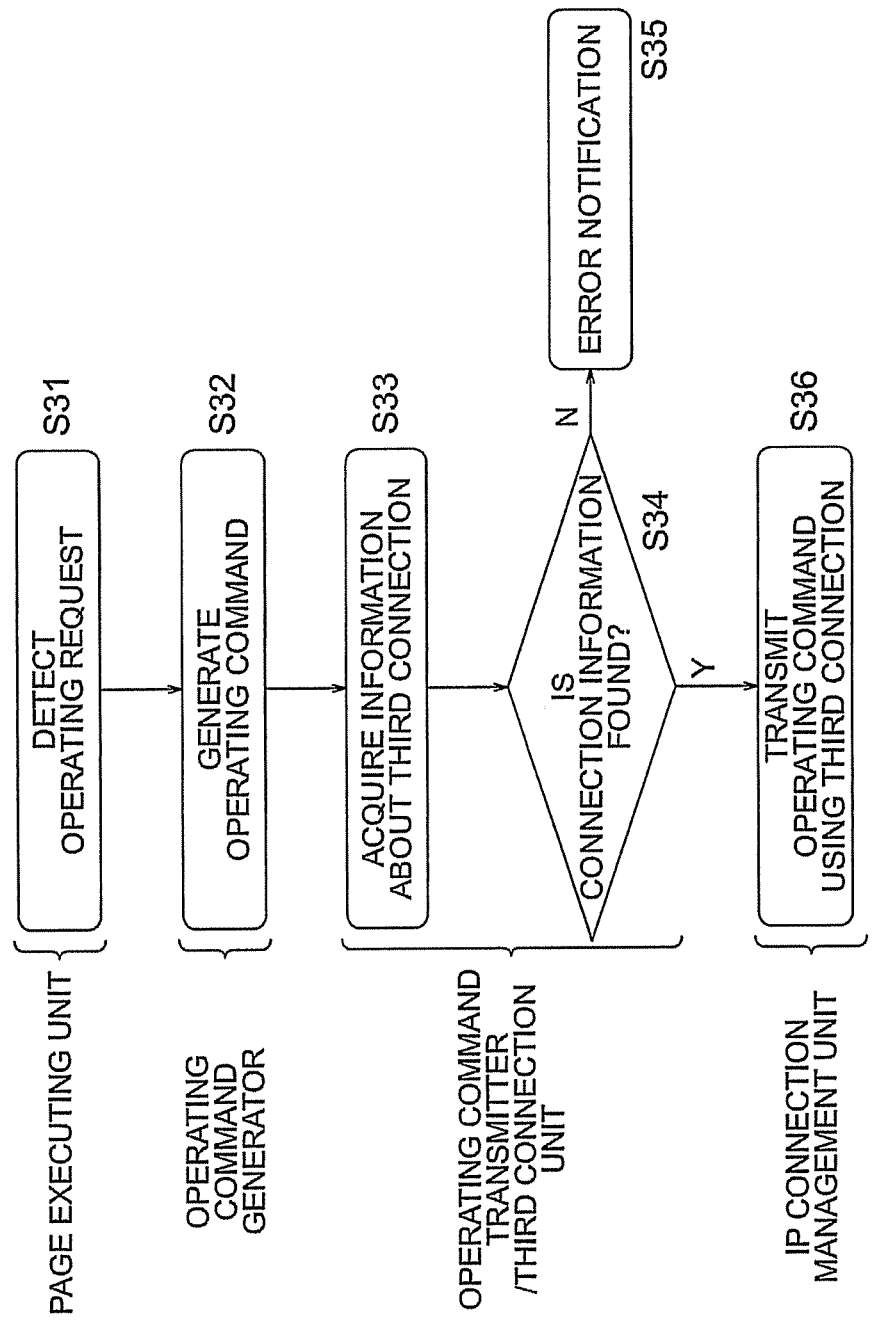
FIG. 8 is a flow chart showing an example of the steps for transmitting a device operating command to the information output device 3.

FIG. 8 is a flow chart showing an example of the steps for transmitting a device operating command to the information output device 3 from the information handling device 1. When a device operating command appears while a Web application is executed, the page executing unit 51 notifies the operating command generator 53 about the operating request, and requests the page executing unit 51 to generate a device operating command (Step S31).

The operating command generator 53 generates a device operating command in a specific format which can be transmitted by the third connection through the third connection unit 35, and returns it to the page executing unit 51 (Step S32). The page executing unit 51 receives the device operating command from the operating command generator 53, and passes it to the operating command transmitter 54 to ask the operating command transmitter 54 to transmit the device operating command. The operating command transmitter 54 acquires, from the main memory 13 etc., the identifier information of the third connection unit 35 stored by the authentication token transmitter 55 when establishing the third connection (Step S33).

If the identifier information cannot be acquired (Step S34), the operating command transmitter 54 considers that the third connection is not established, and returns an error to the page executing unit 51 (Step S35). If the identifier information is found, the operating command transmitter 54 passes the device operating command received from the page executing unit 51 and the identifier information of the third connection unit 35 acquired from the main memory 13 etc. to the IP connection management unit 24, to ask the IP connection management unit 24 to transmit the device operating command. The IP connection management unit 24 specifies the connection based on the identifier information of the first connection unit, and passes the device operating command to the third connection unit 35 to transmit it (Step S36). Also here, as long as the third connection is not disconnected, the device operating command can be transmitted again and again using the third connection unit 35.

Figure 9:
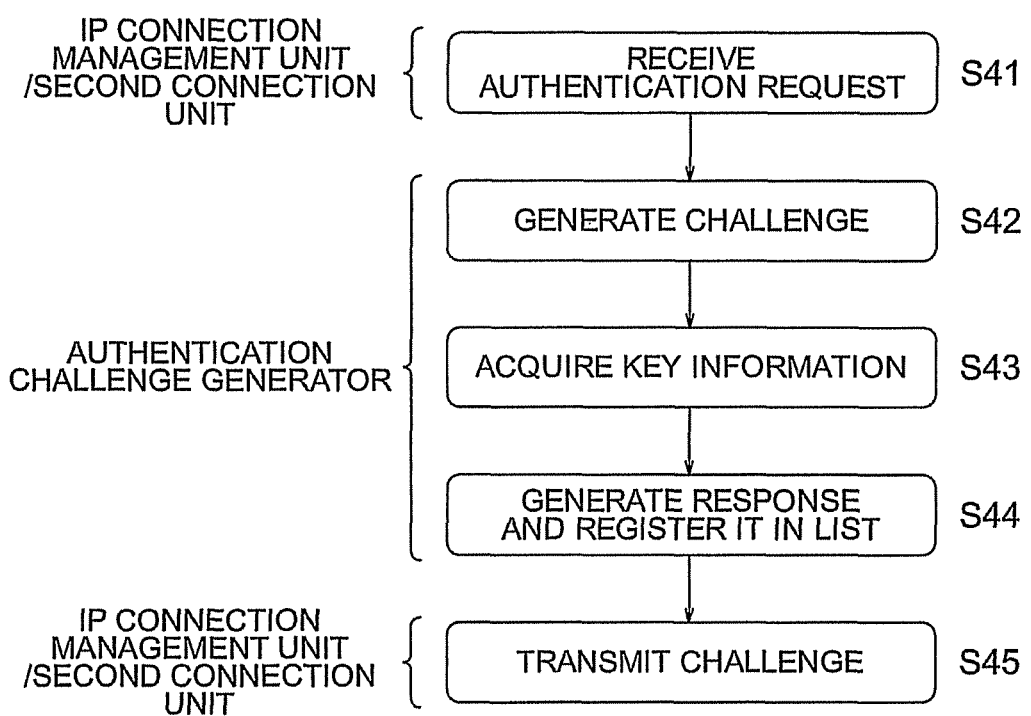
FIG. 9 is a flow chart showing an example of the processing steps performed by the information output device 3 when receiving an authentication request.

FIG. 9 is a flow chart showing an example of the processing steps performed by the information output device 3 when receiving an authentication request. When the IP connection management unit 70 of the information output device 3 receives an authentication request after the second connection is established by the second connection unit 34 (Step S41), the IP connection management unit 70 requests the authentication challenge generator 72 to generate an authentication demander (challenge) (Step S42). Responding to the request, the authentication challenge generator 72 generates, e.g., a random character string as a challenge. Further, the authentication challenge generator 72 acquires an authentication key from a storage region in a storage (not shown) etc. of the information output device 3 (Step S43), generates an authenticator (response) corresponding to the challenge, and registers it in an authenticator list (response list) (Step S44). At this time, the challenge, response, or authentication key used to generate the challenge may be further encrypted with a password. Further, the authentication challenge generator 72 returns the generated authentication demander (challenge) to the IP connection management unit 70. The IP connection management unit 70 returns the authentication demander to the information handling device 1 through the second connection unit 34 (Step S45).

Figure 10:
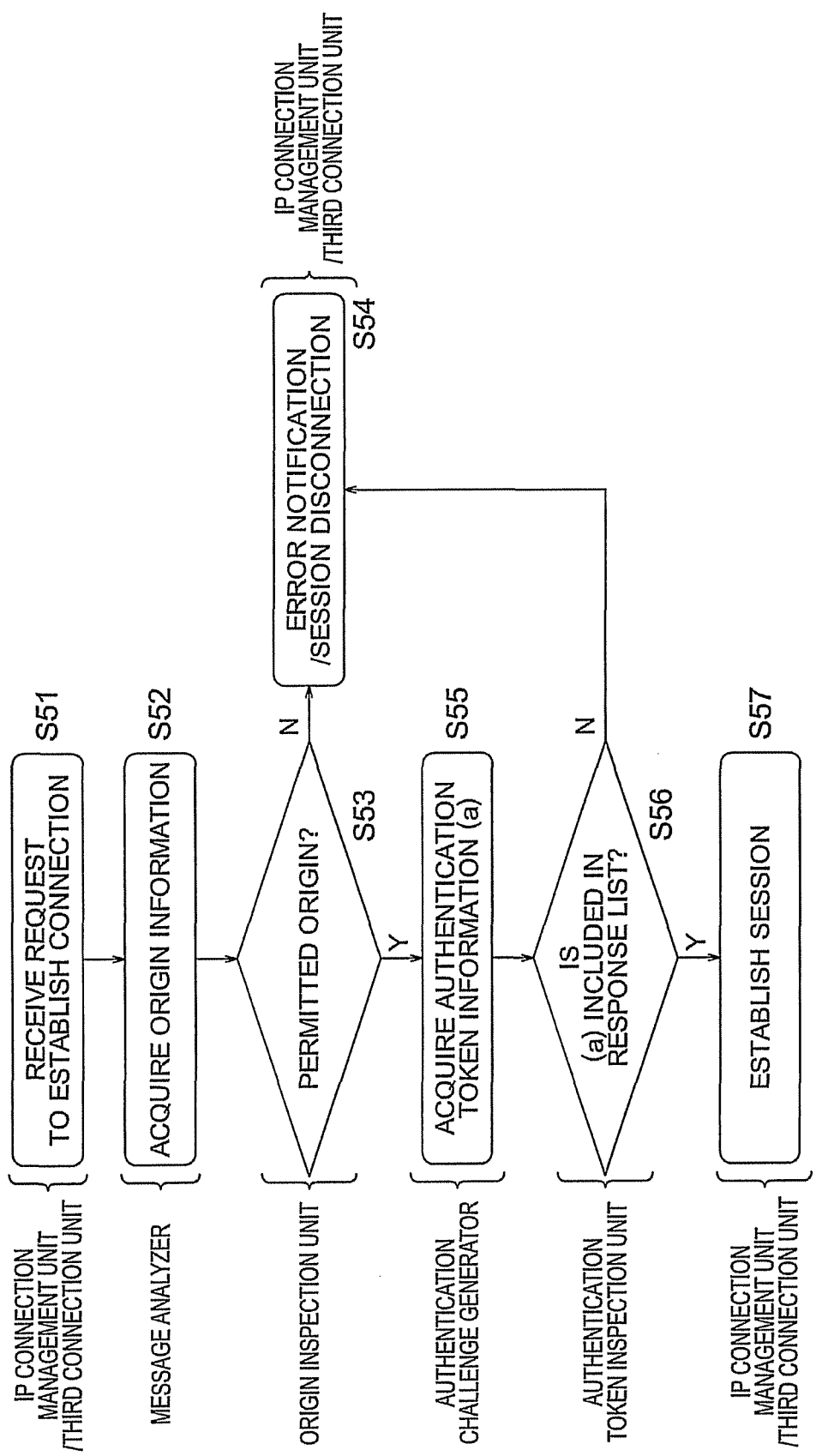
FIG. 10 is a flow chart of the processing steps performed by the information output device 3 when being requested to establish a third connection.

FIG. 10 is a flow chart showing an example of the processing steps performed by the information output device 3 when being requested to establish the third connection. When the IP connection management unit 70 of the information output device 3 receives a request to establish the third connection through the third connection unit 35 (Step S51), the IP connection management unit 70 calls the message analyzer 71. The message analyzer 71 acquires, from the message requesting to establish the connection, origin information of the Web application requesting the connection (Step S52), and passes it to the application origin inspection unit 75.

The application origin inspection unit 75 acquires a permitted origin list from a storage region in a storage (not shown) etc. of the information output device 3, and judges whether the acquired origin information is included in the permitted origin list (Step S53). If not included, an error is raised (Step S54), and the third connection is disconnected. On the other hand, if included, the message analyzer 71 acquires the authentication token (authenticator) information included in the message requesting to establish the connection (Step S55), and passes it to the authentication token inspection unit 73.

The authentication token inspection unit 73 acquires the authenticator list (response list) from the authentication challenge generator 72, and judges whether the received authentication token information is included in the response list (Step S56). If included, the authentication token inspection unit 73 judges that a correct authenticator is transmitted, and completes establishing the third connection (Step S57). On the other hand, if the received authentication token information is not included in the response list, the authentication token inspection unit 73 judges the connection to be illegal and disconnects the connection (Step S54).

Figure 11:
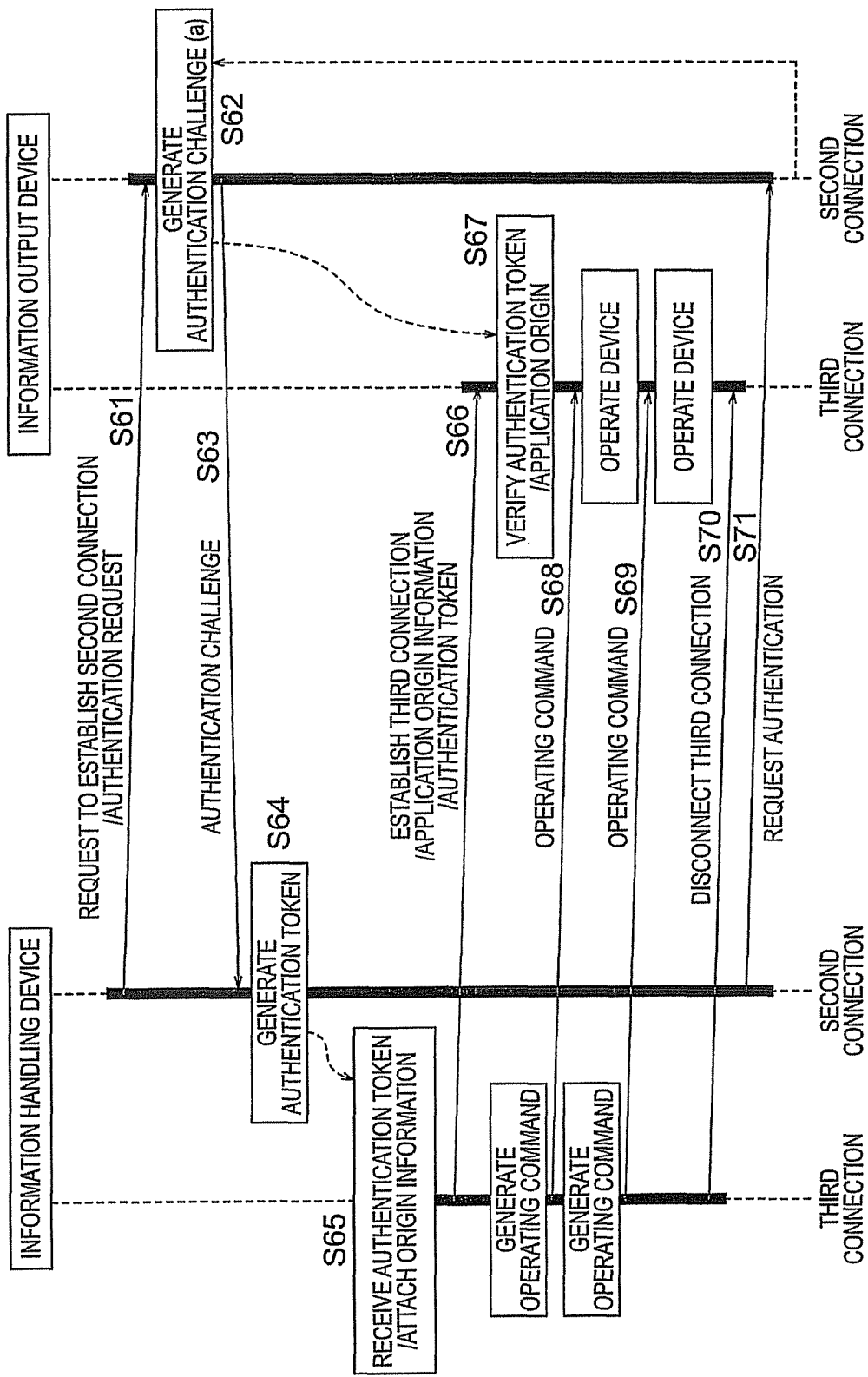
FIG. 11 is a sequence diagram showing an example of the processing steps performed between the information handling device 1 and the information output device 3.

FIG. 11 is a sequence diagram showing an example of the processing steps performed between the information handling device 1 and the information output device 3 according to the first embodiment. The steps includes generating an authentication token and transmitting a device operating command.

When requesting authentication for the first time, the information handling device 1 requests the information output device 3 to establish the second connection using the second connection unit 34 (Step S61). Next, the information handling device 1 receives an authentication challenge generated by the information output device 3 (Steps S62 and S63), and generates a response as an authentication token (Step S64).

Next, before requesting to establish the third connection using the third connection unit 35, the information handling device 1 attaches origin information of the Web application to a transmission message (Step S65), and transmits a request to establish the third connection to the information output device 3 together with the origin information (Step S66).

The information output device 3 verifies the authentication token passed through the third connection (Step S67), and if legitimate, continues the process. Further, the information handling device 1 transmits a device operating command to the information output device 3 through the third connection unit 35 (Step S68).

When the third connection is disconnected due to page transition etc., the information handling device 1 requests authentication again through the second connection unit 34 (Step S69). After that, the information handling device 1 disconnects the third connection (Step S70).

When the second connection is not disconnected, there is no need to repeatedly request to establish the second connection using the second connection unit 34. After authentication is requested (Step S71), Step S62 and subsequent steps are repeated.

In this way, according to the present embodiment, an authentication token guaranteeing the validity of the platform can be attached in the communication session for transmitting a device operating command. That is, the information output device 3 can surely perform device access control in HTTP or WebSocket by using Web application origin information, which was conventionally difficult due to unreliable origin information. Accordingly, available device operation can be changed corresponding to each Web application, which realizes flexible access control for remote operation.

For example, suppose a case where a function of eliminating content recorded in an operation target device is released as in a Web application distributed from "www-.toshiba.com" based on WebSocket protocol. When checking only the WebSocket header, the information handling device 1 is permitted to eliminate content even when it attaches "www.toshiba.com" as origin information regardless of whether it is the actual origin of the application. In this case, the content may possibly be eliminated by a malicious Web application stored in a server different from "www.toshiba.com", particularly in a server allowing everyone to freely store a Web application.

The present embodiment is greatly characterized in that the Web application executing unit 21 and the application authentication processing unit 23 are separated. Generally, it is difficult to embed secret information in JavaScript serving as a language for describing the process of the Web application (corresponding to a part of the Web application executing unit 21 handling JavaScript etc.). Thus, JavaScript is inappropriate to store, e.g., a key for guaranteeing the validity of the platform.

Accordingly, in the present embodiment, the Web application executing unit 21 and the application authentication processing unit 23 are separated so that the application authentication processing unit 23, which is difficult to analyze, handles key information as secret information to carry out a part of authentication and to generate an authentication token. This makes it difficult to emulate the platform of the present embodiment. In the present embodiment, the authentication requester 52 and the authentication token generator 61 connect the modules of the Web application executing unit 21 and those of the application authentication processing unit 23 separated from each other.

When a common key for generating an authentication token cannot be acquired, authentication with the information output device 3 cannot be achieved, which makes it possible for the information output device 3 to correctly determine whether a device operating command is transmitted from a genuine platform.

It is generally difficult to change the execution environment (browser) of the Web application. However, the present embodiment has an advantage that the application authentication processing unit 23 can be mounted as a plug-in since the application authentication processing unit 23 and the browsing unit (a part of the Web application executing unit 21) is clearly separated.

Further, it is assumed that the application authentication processing unit 23 and the Web application executing unit 21 cannot share the same connection frequently since these are separated and may possibly be implement in different languages. Accordingly, the present embodiment is greatly characterized also in that the third connection unit 35 for managing the operating connection (third connection) utilized by the Web application executing unit 21 is separated from the second connection unit 34 for managing the authentication connection (second connection) utilized by the application authentication processing unit 23.

When separating the connections, the information output device 3 needs to confirm that the second connection and the third connection are established with the same information handling device 1. That is, the information output device 3 needs to distinguish whether the third connection is achieved by a malicious application imitating the protocol or by a legitimate application. In order to solve this problem, in the present embodiment, the third connection unit 35 managing the third connection established by the Web application executing unit 21 unable to store secret information receives, from the application authentication processing unit 23, an authentication token generated by the application authentication processing unit 23 through the second connection unit 34 and transmits it to the information output device 3, in order to certify the information output device 3 that the third connection is the operating connection established by a genuine platform. In order to realize this function, the IP connection management unit 24 is provided to manage the third connection unit 35 and the second connection unit 34 independently, which is a characteristic feature of the present embodiment.

Related techniques are disclosed in studies and patents concerning the security for a mobile agent, to verify the legitimacy of the mobile agent on the destination platform of the mobile agent, for example. As one of conventional techniques, a origin platform attaches a signature to a mobile agent so that a destination platform can verify that the mobile agent is not falsified, which makes it possible to prevent the operation of an illegally falsified mobile agent. In the system based on the present embodiment, even when a signature is attached to an application including a device operating code, the legitimacy of the application cannot be guaranteed, which is because the information output device 3 receives only a device operating command and cannot verify the signature of the application.

Further, when attaching a signature only to the device operating command, the signed device operating command may possibly be entirely copied on a platform imitating the device operating protocol and used by another application. According to the present embodiment, even when the device operating command is copied, a platform for illegally operating a device cannot be created, which is because no authentication token can be generated without copying an authentication key (common key) which is included in a code described in a native code and difficult to extract.

In this way, in the first embodiment, the Web application executed by the information handling device 1 requests the information output device 3 to establish the second connection using the second connection unit 34 and to perform authentication, and then the information output device 3 generates an authentication demander (challenge) and transmits it to the information handling device 1.

The information handling device 1 receives this authentication demander, and generates an authentication token by encrypting the authentication demander using a common key managed by the key management unit 63. This authentication token is transmitted to the information output device 3 from which the authentication demander is transmitted, and the information output device 3 receives the authentication token, and encrypts the authentication demander with a common key managed by the information output device 3 to check whether the encrypted authentication demander corresponds to the received one, which makes it possible to verify whether the authentication token is transmitted from a legitimate information handling device 1.

Further, before transmitting the authentication token to the information output device 3, the information handling device 1 requests the information output device 3 to establish the third connection for transmitting an authentication token and a device operating command. At this time, origin information of the Web application is included in the header information of the request to establish the third connection. The information output device 3 receives the request to establish the third connection, verifies whether the origin of the Web application included in this establishment request is registered in a permitted origin list managed by the information output device 3, and establishes the third connection only when it is registered. This makes it possible to prevent the information output device 3 from being freely operated by a device operating command transmitted from an unexpected Web application.

Further, the information handling device 1 has the first connection unit 33 managing the first connection for acquiring a Web application from the Web application distribution server 5, the second connection unit 34 managing the second connection for transmitting and receiving an authenticator and an authentication demander, and the third connection unit 35 managing the third connection for transmitting an authentication token and a device operating command, each being separated from one another. Since these connection units are managed by the IP connection management unit 24, various information transmitted and received through each connection can be uniformly managed.

Further, the common key used to generate an authentication token etc. is retained by the application authentication processing unit 23 in the PF application executing unit 22. Since the common key is not managed in the Web application executing unit 21 for executing a Web application described in a general-purpose language such as HTML and JavaScript, the common key can be managed safely.

Second Embodiment

In the first embodiment, the application authentication processing unit 23 does not inspect the origin of the Web application executed by the page executing unit 51. This leads to a defect that an authentication token is passed to a Web application maliciously executed to request authentication, for example. Accordingly, when such a malicious Web application passes the authentication token to the outside, the malicious Web application can illegally operate the information output device 3 by cooperating with a malicious platform imitating the information transmitted and received by the third connection unit 35. Accordingly, in a second embodiment, the origin of the Web application is checked to pass an authentication token only to a Web application acquired from a reliable Web application distribution server 5, which makes it possible to prevent the authentication token from being illegally utilized.

Figure 12:
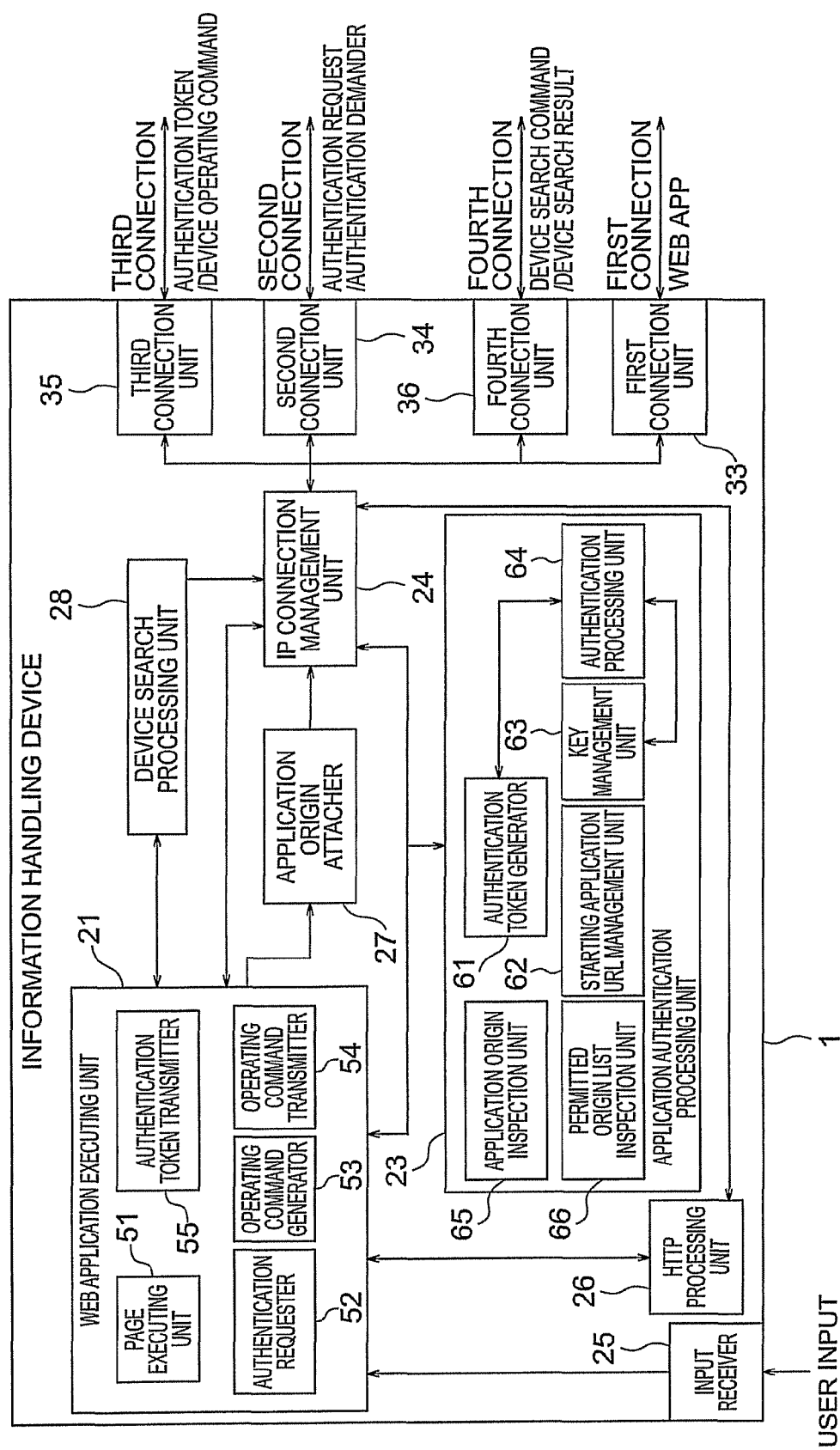
FIG. 12 is a block diagram showing an example of the information handling device 1 according to a second embodiment.

FIG. 12 is a block diagram showing an example of the internal configuration of the information handling device 1 according to the second embodiment. The application authentication processing unit 23 of FIG. 12 is different from FIG. 3 in further having an application origin inspection unit 65 and a permitted origin list inspection unit 66. Note that the permitted origin list inspection unit 66 is not essential.

In FIG. 12, the PF application executing unit 22 is omitted, but the application authentication processing unit 23 is provided within the PF application executing unit 22, similarly to FIG. 2.

The application origin inspection unit 65 judges whether an authentication token may be passed to the origin of a page currently being executed, based on the origin information of the page. Thus, when the authentication token generator 61 is requested by the authentication requester 52 to generate an authentication token, the application origin inspection unit 65 acquires the origin information of the page currently being executed from the page executing unit 51. Further, the application origin inspection unit 65 acquires, from a data storage region in the storage 17, main memory 13, etc. of the information handling device 1, a list of the origins permitted to receive the token (hereinafter referred to as permitted origin list), and judges whether the origin information of the page currently being executed is included in the list. If the origin information is included, the application origin inspection unit 65 permits passing the authentication token and continues the process. If the origin information is not included, the application origin inspection unit 65 does not permit passing the authentication token, and returns an error to the page executing unit 51. For example, when the domains of "www.toshiba.com" and "www.toshiba.co.jp" are included in the permitted origin list, a Web application acquired from the domain of "www.toshiba.com" receives an authentication token, but a Web application acquired from the domain of "www.toshiba.co.uk" does not receive the authentication token. Further, when the information handling device 1 has the permitted origin list inspection unit 66, the application origin inspection unit 65 passes the permitted origin list to the permitted origin list inspection unit 66 to ask the permitted origin list inspection unit 66 to verify the validity of the permitted origin list.

Further, if the permitted origin list is falsified, there is a risk that the authentication token is passed to an unexpected information output device 3. Accordingly, the information handling device 1 according to the second embodiment may have the permitted origin list inspection unit 66 to verify the falsification of the permitted origin list. The permitted origin list inspection unit 66 is not essential when the application origin list can be stored in a storage region inconvenient for falsification, such as a read only memory. The permitted origin list inspection unit 66 verifies falsification by verifying the signature attached to the permitted origin list using a public key owned by the permitted origin list inspection unit 66, and returns an error if any falsification is detected.

A generally known method such as RSA signature, DSA signature, etc. should be used to verify the signature.

Figure 13:
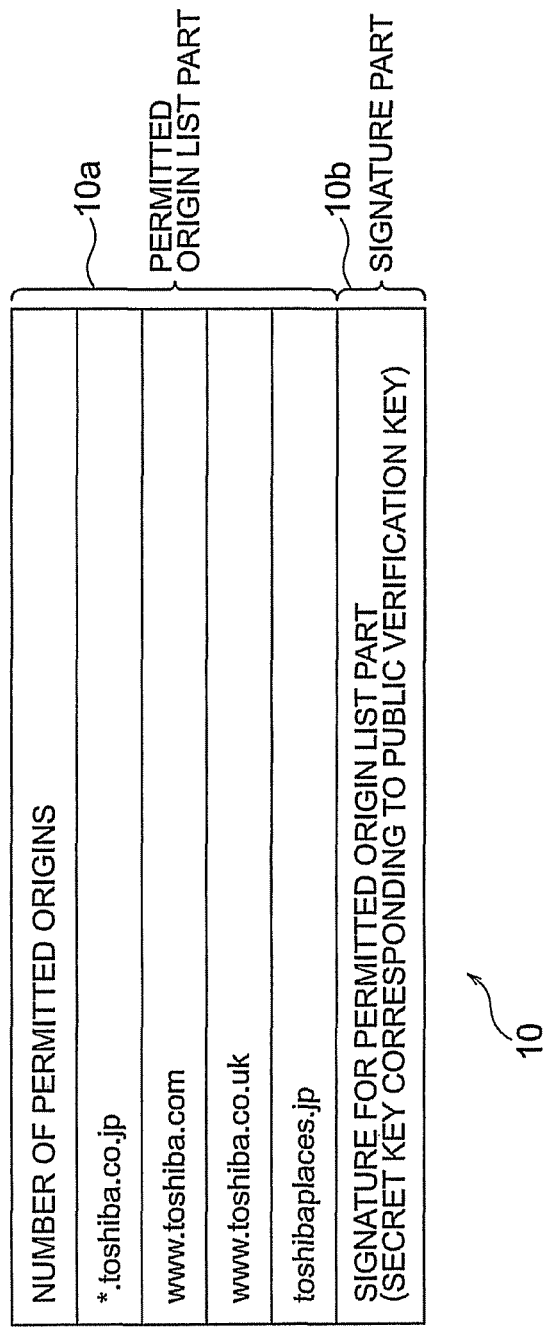
FIG. 13 is a diagram showing an example of the data configuration of a permitted origin list 10.

FIG. 13 is a diagram showing an example of the data configuration of a permitted origin list 10. The permitted origin list 10 consists of a permitted origin list part 10*a* and a signature part 10*b*. The permitted origin list part 10*a* includes (1) the number of permitted origins, and (2) a list of the permitted origins (the number of elements is as specified in (1)). At this time, the information about the permitted origins may include information using a regular expression based on, e.g., the POSIX standard. The regular expression is one of the methods for expressing a set of character strings with one character string. On the other hand, the signature part 10*b* includes a signature for verifying falsification of the permitted origin list part 10*a*. This signature is based on a secret key corresponding to the public key owned by the permitted origin list inspection unit 66.

Figure 14:
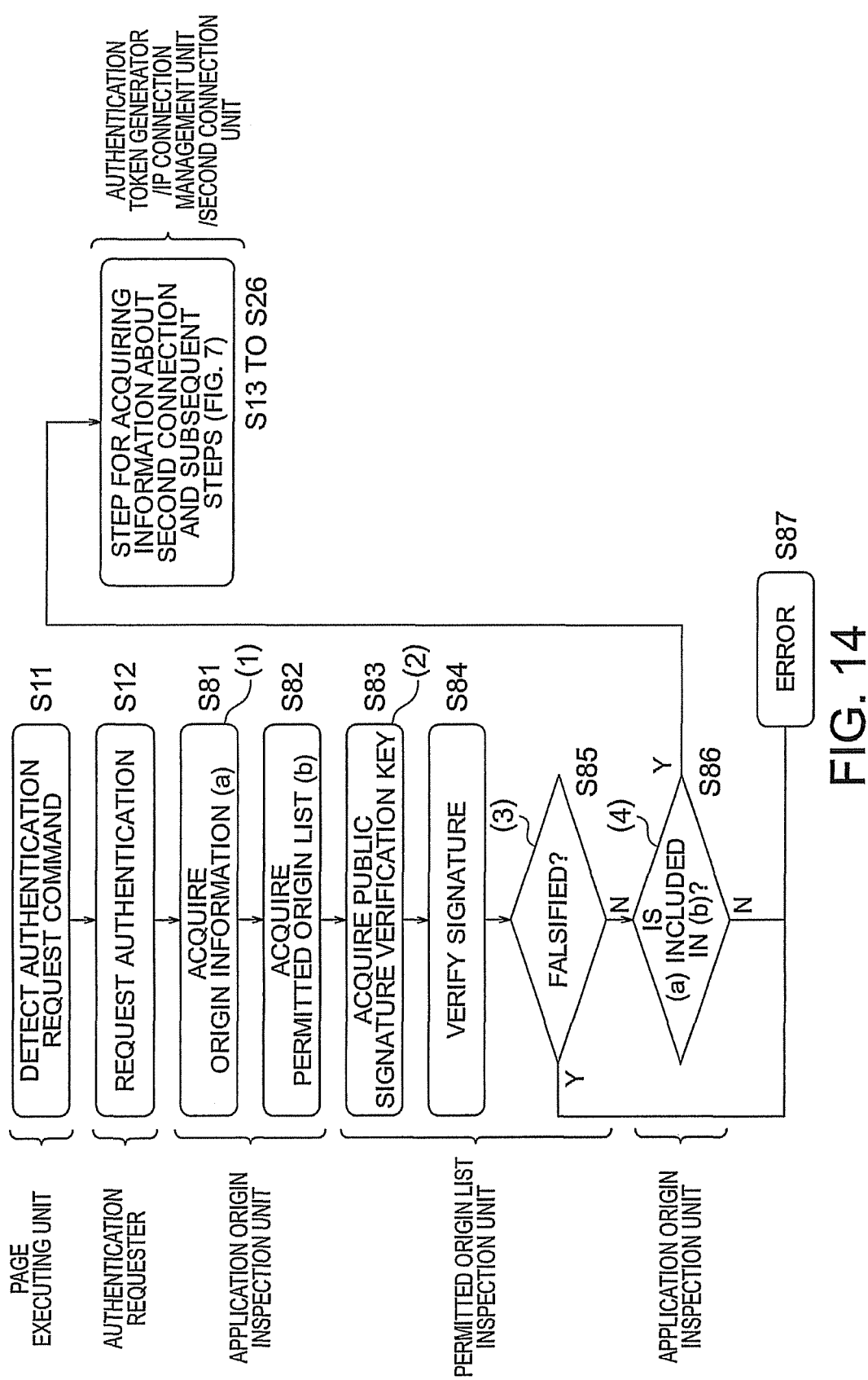
FIG. 14 is a flow chart showing an example of the processing steps when an authentication request command is detected.

FIG. 14 is a flow chart showing an example of the processing steps when an authentication request command is detected. The flow chart of FIG. 14 is different from FIG. 7 in further having steps (1) to (4) for verifying the origin of the application. Here, explanation will be given only on the steps (1) to (4).

When receiving an authentication request from the authentication requester 52, the authentication token generator 61 asks the application origin inspection unit 65 to inspect the origin of the application. The application origin inspection unit 65 acquires, from the page executing unit 51, the origin of the Web application currently being executed and requesting authentication (Step S81). That is, the page executing unit 51 acquires the origin of the Web application currently being executed, and returns the origin data as requested.

Next, the application origin inspection unit 65 acquires a permitted origin list from a memory device such as a storage (Step S82). Further, when the information handling device 1 has a permitted origin inspection unit, the application origin inspection unit 65 passes the permitted origin list to the permitted origin list inspection unit 66, and asks the permitted origin list inspection unit 66 to verify the falsification of the permitted origin list. The permitted origin list inspection unit 66 acquires a public key for verifying the signature attached to and managed by the permitted origin list inspection unit 66 (Step S83).

The permitted origin list inspection unit verifies the signature of the permitted origin list using this public key (Step S84). If no falsification is detected as a result of verification, whether the origin of the application is included in the permitted origin list is judged (Steps S85 and S86).

If any falsification is detected at Step S84, or if the origin of the application is judged not to be included in the permitted origin list at Step S85, an error is returned to the page executing unit 51 (Steps S85 and S87). If the origin of the application is included in the permitted origin list, Step S13 and subsequent steps in FIG. 7 are performed.

The present embodiment can prevent a Web application located on the Web application distribution server 5 which is not assumed by the creator of the permitted origin list from generating an authentication token, which makes it possible to reduce the risk that an authentication token is generated by an illegal Web application. Reducing the risk that the authentication token is illegally utilized means that remote operation by an illegal Web application can be prevented.

As stated above, in the second embodiment, when transmitting an authentication request to the information output device 3, the information handling device 1 verifies whether the origin of the Web application requesting authentication is registered in the permitted origin list, which eliminates the possibility of transmitting an authentication request from an unexpected Web application to the information output device 3.

Third Embodiment

In the second embodiment, the permitted origin list is not updated. Since the permitted origin list is fixed, the Web application distribution server 5 storing a Web application permitted to perform remote operation cannot be added or eliminated. On the other hand, in a third embodiment, the permitted origin list is updated to make it possible to add or eliminate the Web application distribution server 5.

Figure 15:
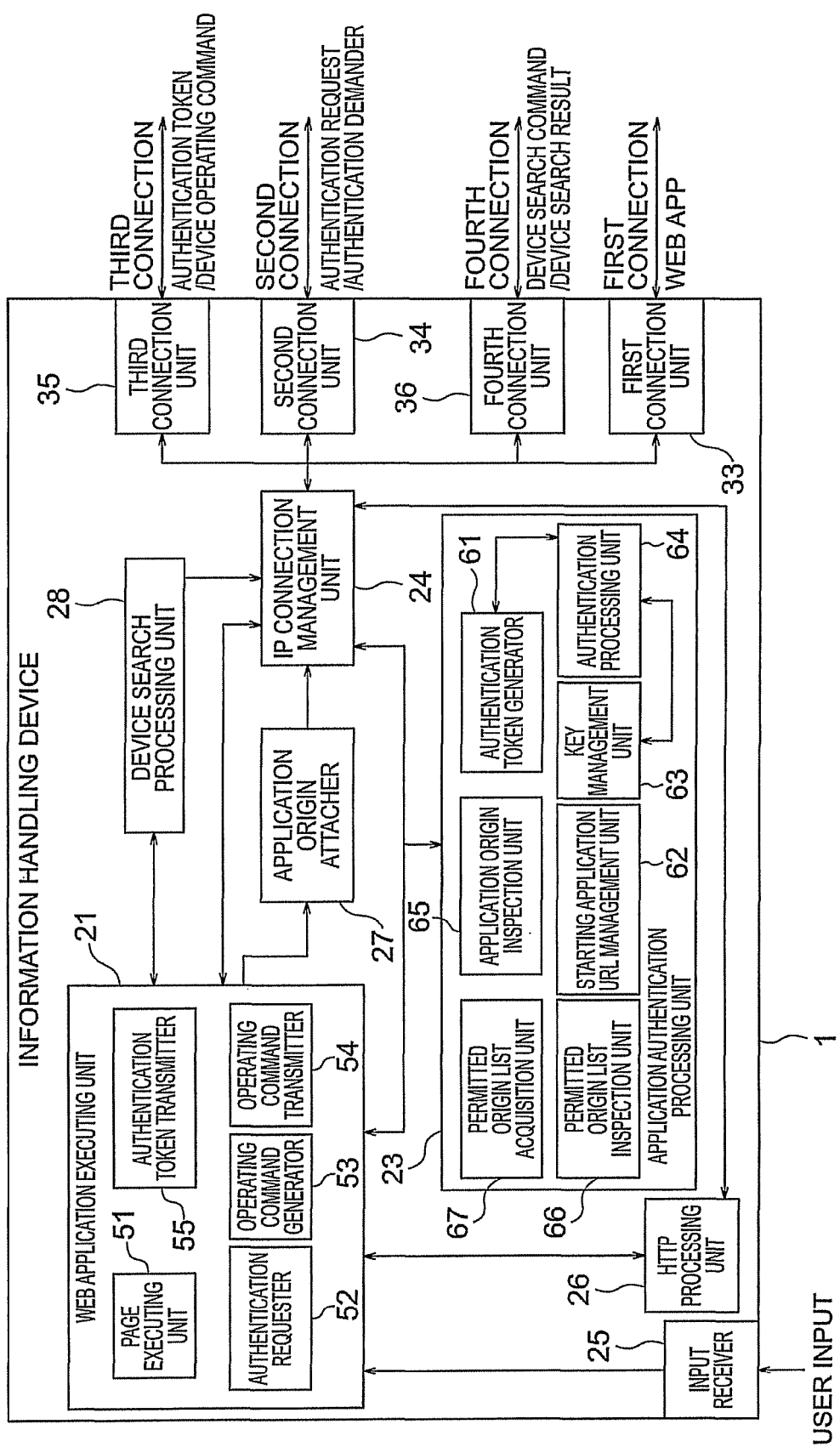
FIG. 15 is a block diagram showing an example of the information handling device 1 according to a third embodiment.

FIG. 15 is a block diagram showing an example of the internal configuration of the information handling device 1 according to the third embodiment. FIG. 15 is different from FIG. 3 in that the application authentication processing unit 23 further has a permitted origin list acquisition unit 67. In FIG. 15, the PF application executing unit 22 is omitted, but the application authentication processing unit 23 is provided within the PF application executing unit 22, similarly to FIG. 2.

The permitted origin list acquisition unit 67 utilizes the HTTP processing unit 26 to acquire a permitted origin list from the Web application distribution server 5 through the IP connection management unit 24 and the first connection unit 33 called by the IP connection management unit 24. When the permitted origin list is updated, the permitted origin list acquisition unit 67 passes the acquired permitted origin list to the permitted origin list inspection unit 66 to request the permitted origin list inspection unit 66 to verify the list. Whether the list is updated or not can be judged by comparing the acquired permitted origin list with the permitted origin list stored in the information handling device 1 or by comparing the last update date/time of the list files. Further, the permitted origin list acquisition unit 67 acquires a verification result from the permitted origin list inspection unit 66. When no falsification is detected, the permitted origin list acquisition unit 67 replaces the permitted origin list stored in the storage of the information handling device 1 with the permitted origin list acquired from the Web application distribution server 5.

Figure 16:
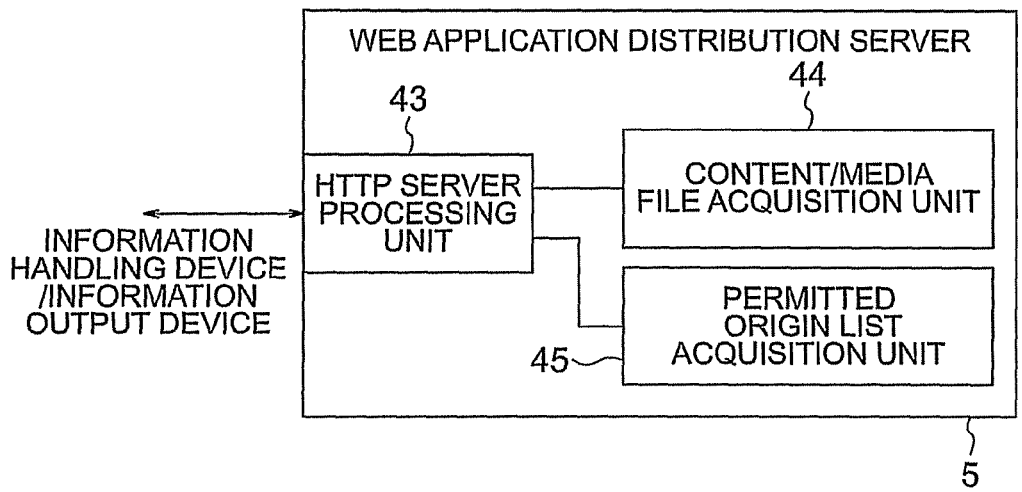
FIG. 16 is a block diagram showing the Web application distribution server 5 according to the third embodiment.

FIG. 16 is a block diagram showing the internal configuration of the Web application distribution server 5 according to the third embodiment. FIG. 16 is different from FIG. 5 in that the Web application distribution server 5 further has a permitted origin list acquisition unit 45.

The permitted origin list acquisition unit 45 acquires a latest permitted origin list from a storage (not shown) in accordance with a request from the information handling device 1 or the information output device 3, and returns it to the requester through the HTTP server processing unit 43. By updating the permitted origin list managed by the Web application distribution server 5, the information handling device 1 and the information output device 3 can keep the permitted origin list having the latest information.

Figure 17:
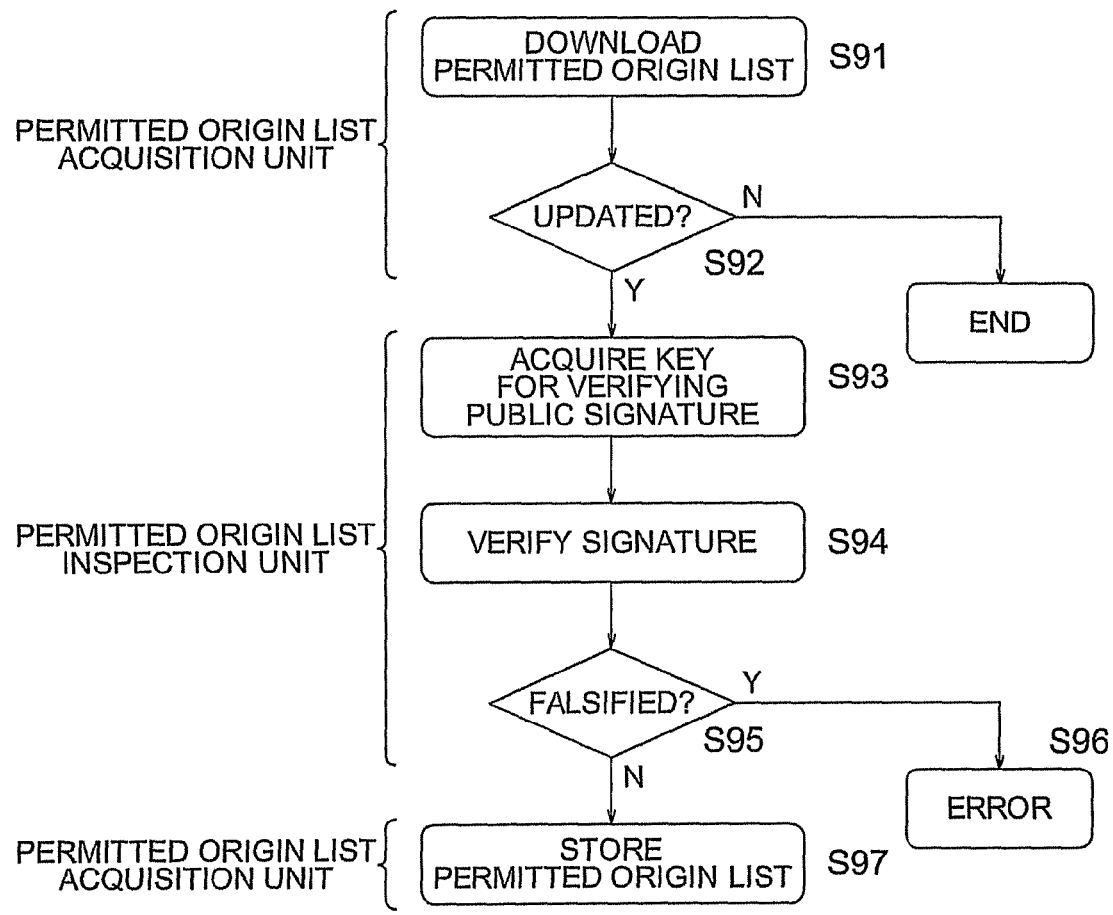
FIG. 17 is a flow chart showing an example of the processing steps for updating the permitted origin list.

FIG. 17 is a flow chart showing an example of the processing steps for updating the permitted origin list. The permitted origin list acquisition unit 45 is called periodically or when the information handling device 1 is started, to acquire (download) a latest permitted origin list from the Web application distribution server 5 through the HTTP processing unit 26, the IP connection management unit 24 called by the HTTP processing unit 26, and the first connection unit 33 called by the IP connection management unit 24 (Step S91). Then, the latest permitted origin list is compared to the permitted origin list stored in the information handling device 1 (Step S92).

If no updating is found, the process is completed. On the other hand, if any updating is found, the permitted origin list inspection unit acquires a public key for verifying a signature from the information handling device 1 (Step S93), and verifies the signature of the permitted origin list acquired from the Web application distribution server 5 (Step S94). If any falsification is found, the permitted origin list inspection unit raises an error (Steps S95 and S96). If no falsification is detected, the permitted origin list inspection unit overwrites the permitted origin list stored in the information handling device 1 with the permitted origin list acquired from the Web application distribution server 5 (Steps S95 and S97).

In this way, in the third embodiment, the Web application distribution server 5 updates the permitted origin list. Since the information handling device 1 periodically accesses the Web application distribution server 5 to acquire the latest permitted origin list, the information handling device 1 can keep holding the latest permitted origin list.

Fourth Embodiment

In a fourth embodiment to be explained below, a permitted origin list is attached to a use certificate issued by a reliable server to each application, in order to judge whether or not to pass an authentication token based on the list. Permitted origin information can be changed on a Web application basis. Here, the use certificate is information certifying that a Web application transmitting a device operating command is distributed from a legitimate Web application distribution server 5. The use certificate is issued to each Web application. The use certificate is not issued corresponding to every Web application, and limited Web applications can utilize the use certificate.

Figure 18:
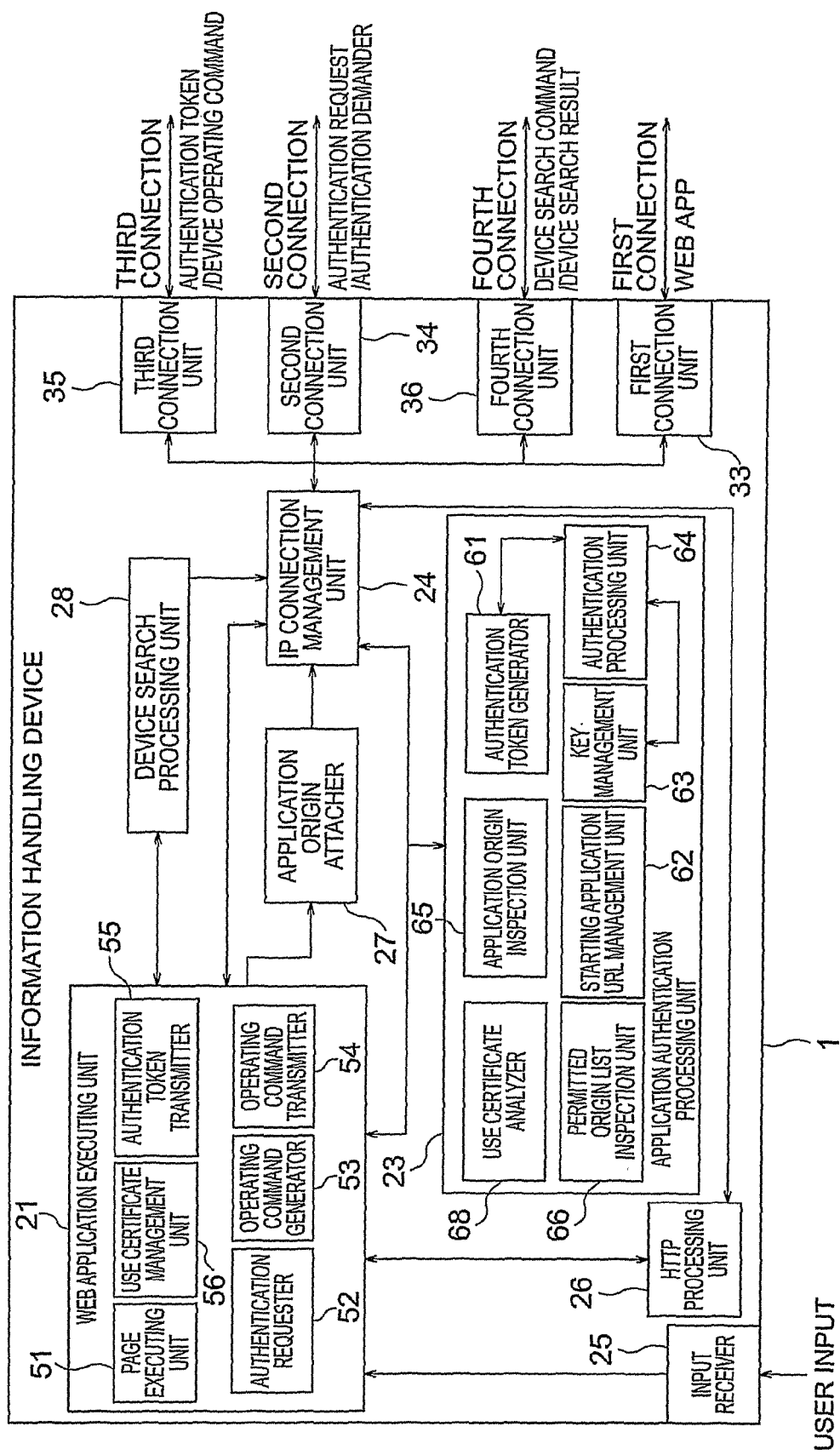
FIG. 18 is a block diagram showing an example of the information handling device 1 according to a fourth embodiment.

FIG. 18 is a block diagram showing an example of the internal configuration of the information handling device 1 according to the fourth embodiment. FIG. 18 is different from FIG. 3 in that the application authentication processing unit 23 further has a use certificate analyzer 68, and that the Web application executing unit 21 further has a use certificate management unit 56. In FIG. 18, the PF application executing unit 22 is omitted, but the application authentication processing unit 23 is provided within the PF application executing unit 22, similarly to FIG. 2.

The use certificate management unit 56 acquires a use certificate for Web application from a reliable Web application distribution server 5 through the IP connection management unit 24 and the first connection unit 33 called by the IP connection management unit 24, and passes it to the use certificate analyzer 68. At this time, identification information of the application is passed. The use certificate includes permitted origin list information and signature information together with permission information to operate a device. This signature is based on public key encryption. As a method for the public key encryption, a generally known method such as RSA encryption should be used.

The use certificate analyzer 68 analyzes the use certificate acquired by the use certificate management unit 56, and extracts a permitted origin list.

Figure 19:
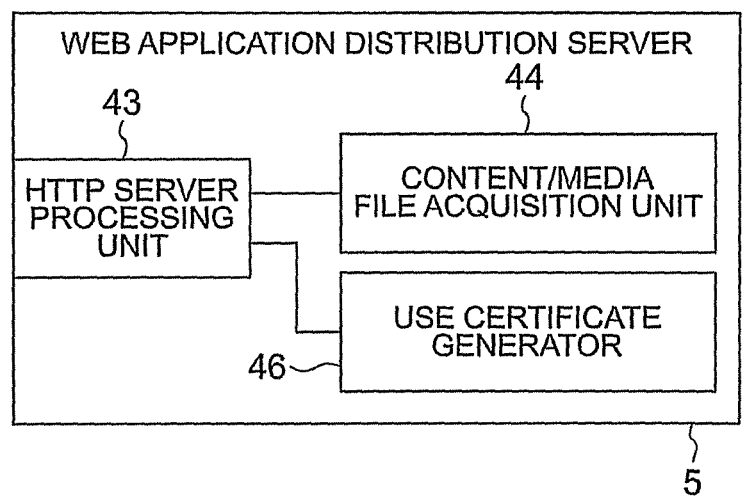
FIG. 19 is a block diagram showing the Web application distribution server 5 according to the fourth embodiment.

FIG. 19 is a block diagram showing the internal configuration of the Web application distribution server 5 according to the fourth embodiment. FIG. 19 is different from FIG. 5 in that the Web application distribution server 5 further has a use certificate generator 46.

In accordance with a use certificate acquisition request from the information handling device 1, the use certificate generator 46 generates a use certificate for each Web application and returns it. The use certificate generator 46 receives the identification information of a Web application, acquires, from a storage (not shown), permitted origin list information corresponding to the Web application together with permission information to operate a device, and returns the information with a signature to the requester through the HTTP server processing unit 43. The use certificate generator 46 may read and return a use certificate previously generated and stored in a storage (not shown) when receiving a use certificate acquisition request, instead of dynamically generating the use certificate.

Figure 20:
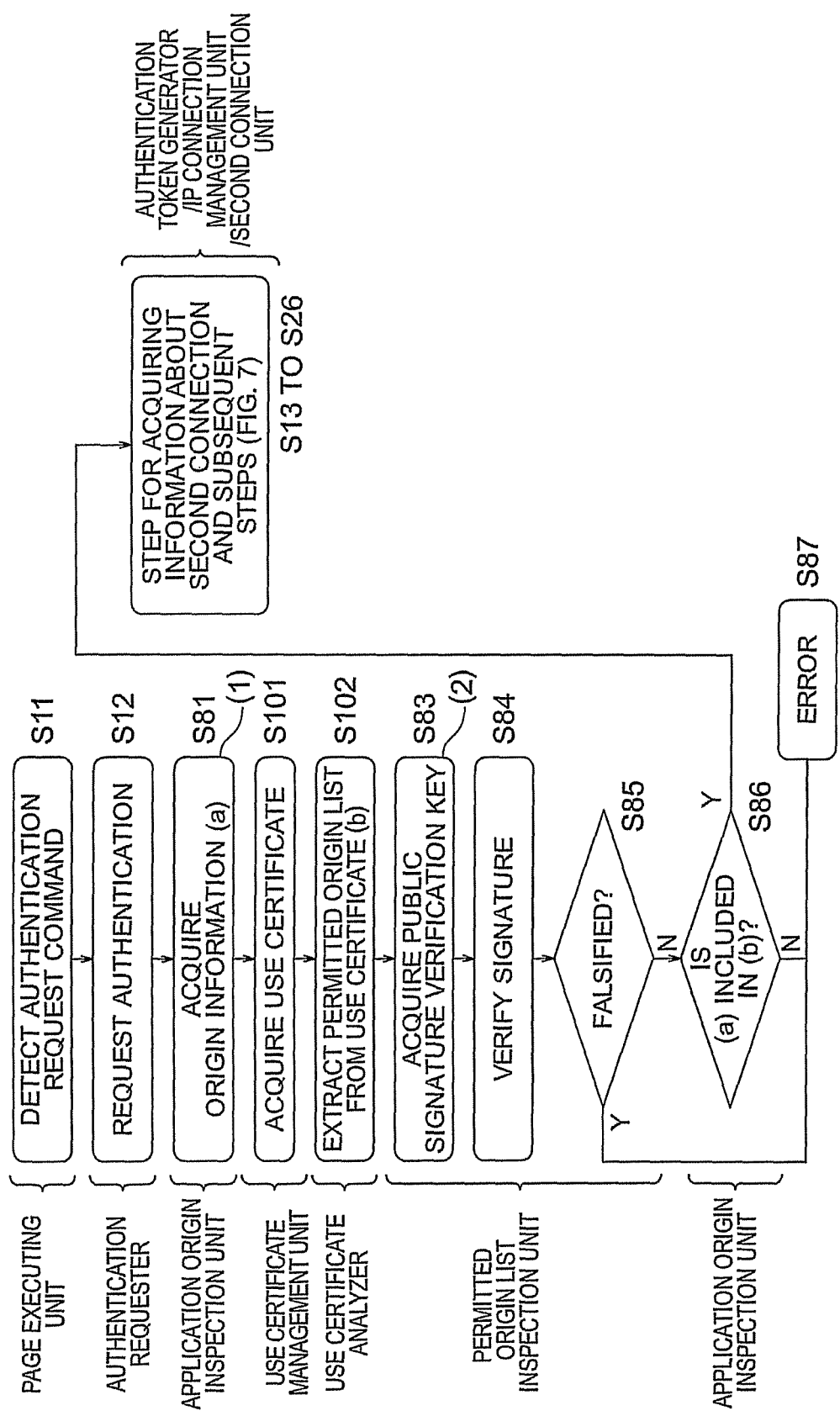
FIG. 20 is a flow chart showing an example of the processing steps when an authentication request command is detected.

FIG. 20 is a flow chart showing an example of the processing steps when an authentication request command is detected. FIG. 20 is different from FIG. 14 in steps (1) and (2) for acquiring a permitted origin list. Here, explanation will be given only on the steps (1) to (2).

The use certificate management unit 56 is called by the application origin inspection unit 65, and acquires a use certificate for each application from the Web application distribution server 5 through the first connection unit 33 called by the IP connection management unit 24 (Step S101). Then, the acquired use certificate is passed to the use certificate analyzer 68. The use certificate analyzer 68 receives and analyzes the use certificate to extract a permitted origin list from the use certificate (Step S102). Further, the use certificate analyzer 68 passes it to the permitted origin list inspection unit 66 to ask the permitted origin list inspection unit 66 to inspect whether any falsification is included.

The use certificate acquired from the Web application distribution server 5 is transmitted to the information output device 3 together with a device operating command. Upon receiving the use certificate and device operating command, the information output device 3 judges whether or not to receive the device operating command, based on the information of the use certificate.

As stated above, in the fourth embodiment, the information handling device 1 acquires a use certificate from the Web application distribution server 5, and verifies the Web application origin requesting authentication, based on a permitted origin list included in this use certificate. This prevents an authentication request transmitted from an unexpected Web application to the information output device 3. Further, the use certificate makes it possible for the information handling device 1 to verify that the Web application is transmitted from a legitimate Web application distribution server 5.

Fifth Embodiment

In the first embodiment, the caller of the application authentication processing unit 23 is not verified. Depending on how to implement the application authentication processing unit 23, the application authentication processing unit 23 can be extracted and used in an illegal information handling device 1 faking application origin information. On the other hand, in a fifth embodiment, the caller of the application authentication processing unit 23 is verified to judge whether the caller corresponds to expected caller information, which makes it possible to prevent illegal use.

Figure 21:
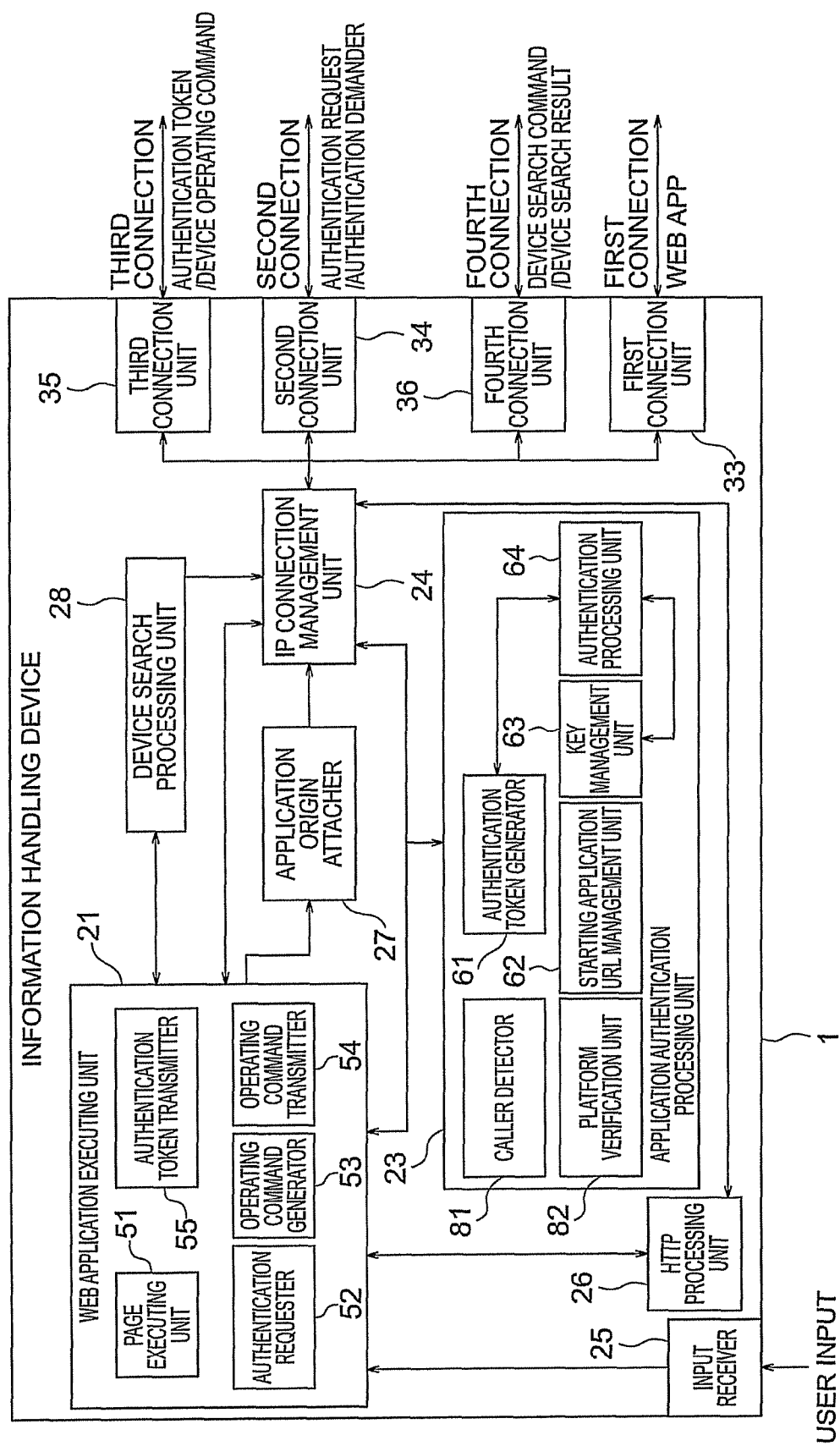
FIG. 21 is a block diagram showing the information handling device 1 according to a fifth embodiment.

FIG. 21 is a block diagram showing the internal configuration of the information handling device 1 according to the fifth embodiment.

FIG. 21 is different from FIG. 3 in that the application authentication processing unit 23 further has a caller detector 81 and a platform verification unit 82.

When transmitting an authentication request, the caller detector 81 determines which part of a Web application is calling the application authentication processing unit 23, and obtains its identifier. A Web application is a set of many software modules (hereinafter, simply referred to as modules). The caller detector 81 passes the identifier of the caller module to the platform verification unit 82 to ask the platform verification unit 82 to judge whether the caller is legitimate.

The platform verification unit 82 judges whether the caller is an expected module. Upon receiving the identifier of the caller module from the caller detector 81, the platform verification unit 82 acquires expected caller information managed thereby and actual caller module information, and verifies whether these correspond to each other. As a verification method in this case, the hash value of the caller module may be calculated to judge whether it corresponds to an expected one, the call flow of the module (caller address) may be referred to judge whether it corresponds to an expected one, or the file name of the caller module may be referred to judge whether it corresponds to an expected one.

In the present embodiment, an illegal caller can be removed without storing a secret in the Web application executing unit 21.

Figure 22:
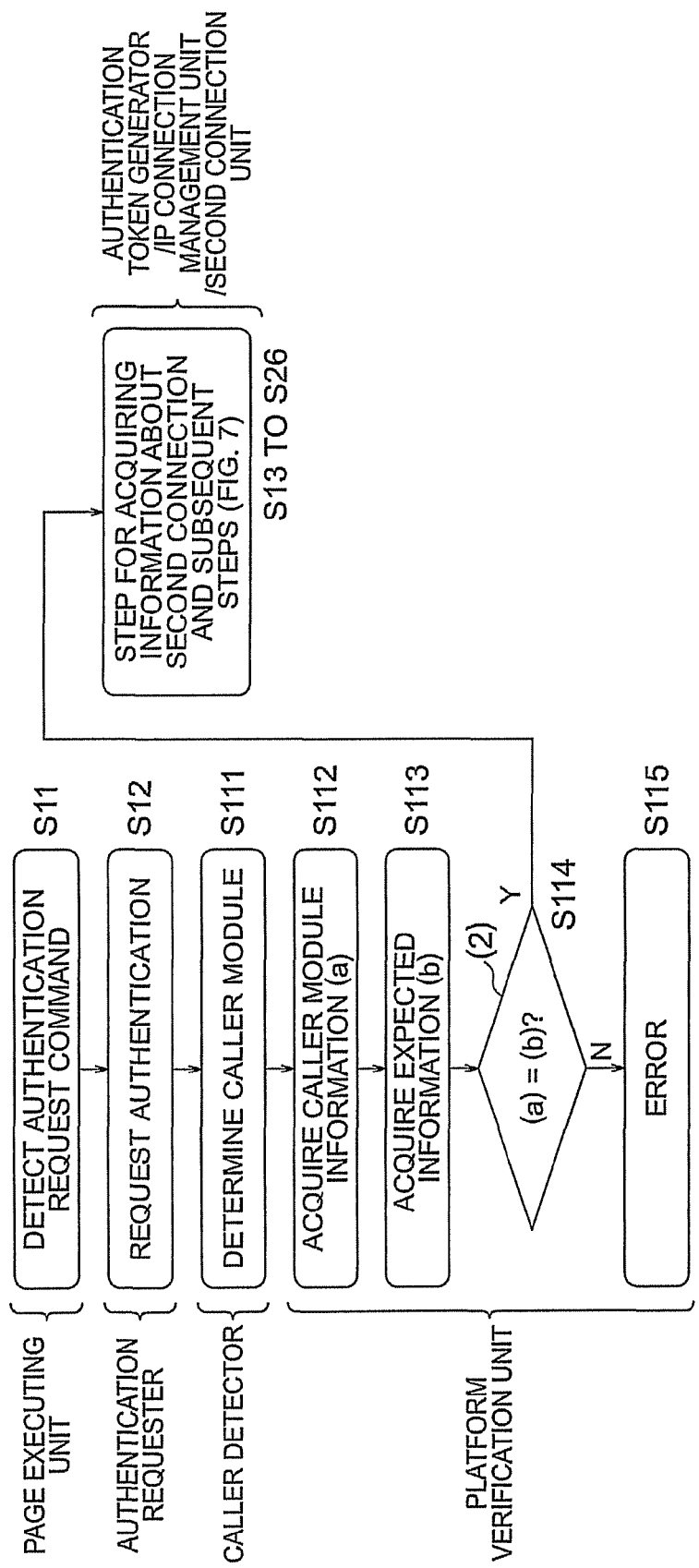
FIG. 22 is a flow chart showing the processing steps when an authentication request command is detected according to the fifth embodiment.

FIG. 22 is a flow chart showing the processing steps when an authentication request command is detected according to the fifth embodiment. The flow chart of FIG. 22 is different from FIG. 7 in further having steps (1) and (2) for verifying the platform. Here, explanation will be given only on the steps (1) and (2).

When the authentication token generator 61 is called by the authentication requester 52, the authentication token generator 61 asks the caller detector 81 to detect a caller module (Step S12). The caller detector 81 determines the module calling the authentication token generator 61 (Step S111), and returns the identifier of the module to the authentication token generator 61. Further, the authentication token generator 61 passes the module identifier received from the caller detector 81 to the platform verification unit 82 to ask the platform verification unit 82 to verify the caller (Step S112). The platform verification unit 82 acquires, from the module identifier, information unique to the module (a) (Step S113). This unique information is, e.g., the hash value of the program of the module, the caller address on the main memory 13 storing the module, or the file name of the module. Further, the platform verification unit 82 acquires unique information (b) previously stored in a region inconvenient for falsification. Further, the platform verification unit 82 judges whether the unique information (a) acquired from the caller corresponds to the expected unique information (b) (Step S114). If corresponding, the platform verification unit 82 judges the caller to be legitimate and proceeds to Steps S13 to S26 of FIG. 7, and if not corresponding, the platform verification unit 82 judges the caller to be illegal and generates an error (Step S115).

As stated above, in the fifth embodiment, the platform verification unit 82 is provided to verify which module calls the application authentication processing unit 23, in order to prevent an illegal information handling device 1 faking the application authentication processing unit 23 for generating an authentication token. This makes it possible to specify a Web application module calling the application authentication processing unit 23, preventing the application authentication processing unit 23 from being illegally faked.

Sixth Embodiment

The fifth embodiment is premised on not storing a secret in the Web application executing unit 21. However, when secret information can be stored in the Web application executing unit 21, it is possible to prevent the application authentication processing unit 23 from being illegally utilized through authentication.

Figure 23:
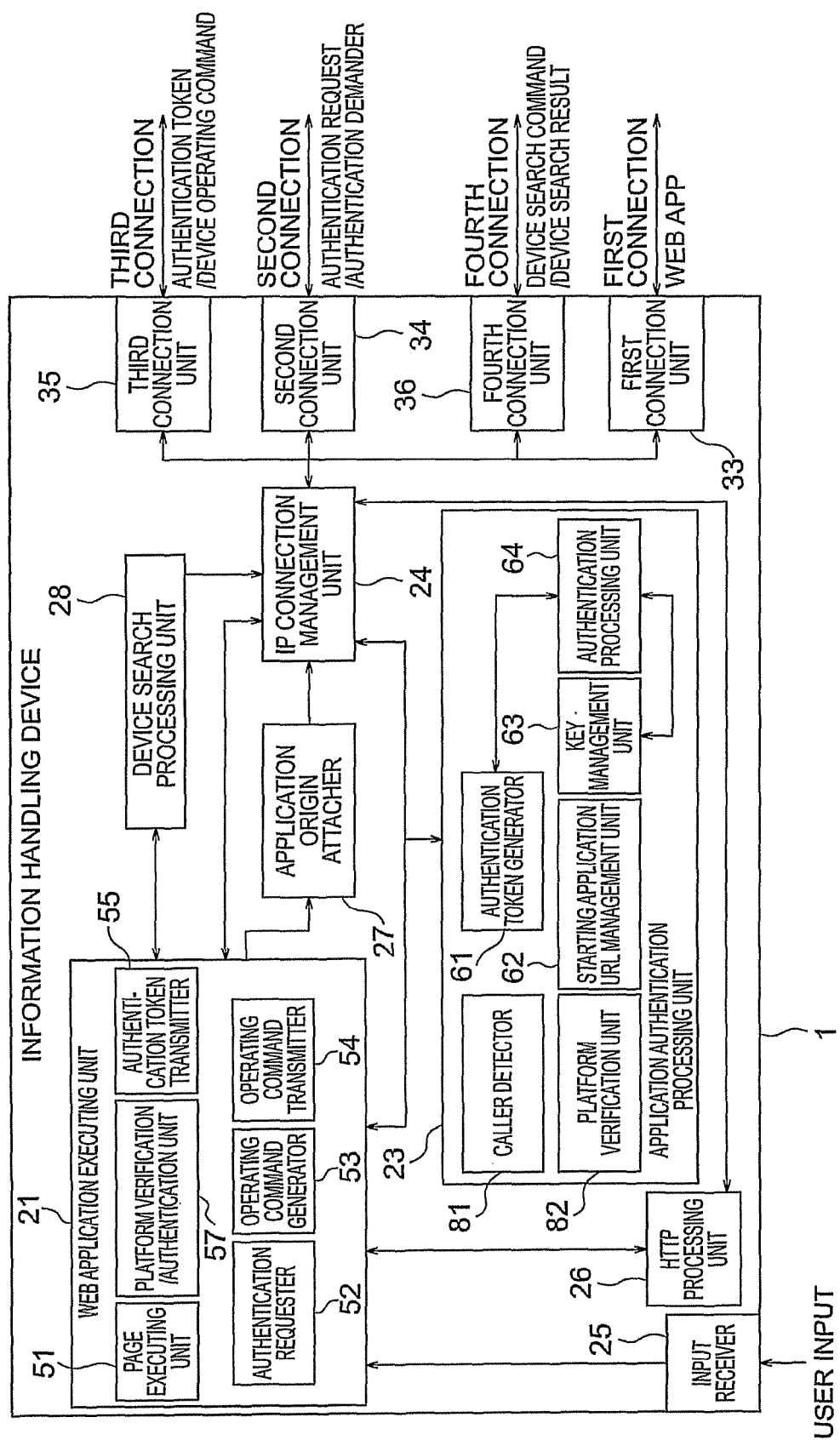
FIG. 23 is a block diagram showing the information handling device according to a sixth embodiment.

FIG. 23 is a block diagram showing the internal configuration of the information handling device according to a sixth embodiment. FIG. 23 is different from FIG. 21 in that the Web application executing unit 21 further has a platform verification/authentication unit 57. In FIG. 23, the PF application executing unit 22 is omitted, but the application authentication processing unit 23 is provided within the PF application executing unit 22, similarly to FIG. 2.

The platform verification/authentication unit 57 has key information, and performs authentication with the platform verification unit 82 using the key. A generally known method such as challenge and response authentication should be used to perform this authentication. As long as the key information used for authentication is not stolen, it is difficult to create an operating device imitating the platform verification/authentication unit 57. Generally, integrity verification explained in the fifth embodiment requires more implementation cost than authentication. It is advantageous to utilize the sixth embodiment when the Web application executing unit 21 can store a secret, that is, when the Web application executing unit 21 can store key information preventing it from being read from a third party.

Figure 24:
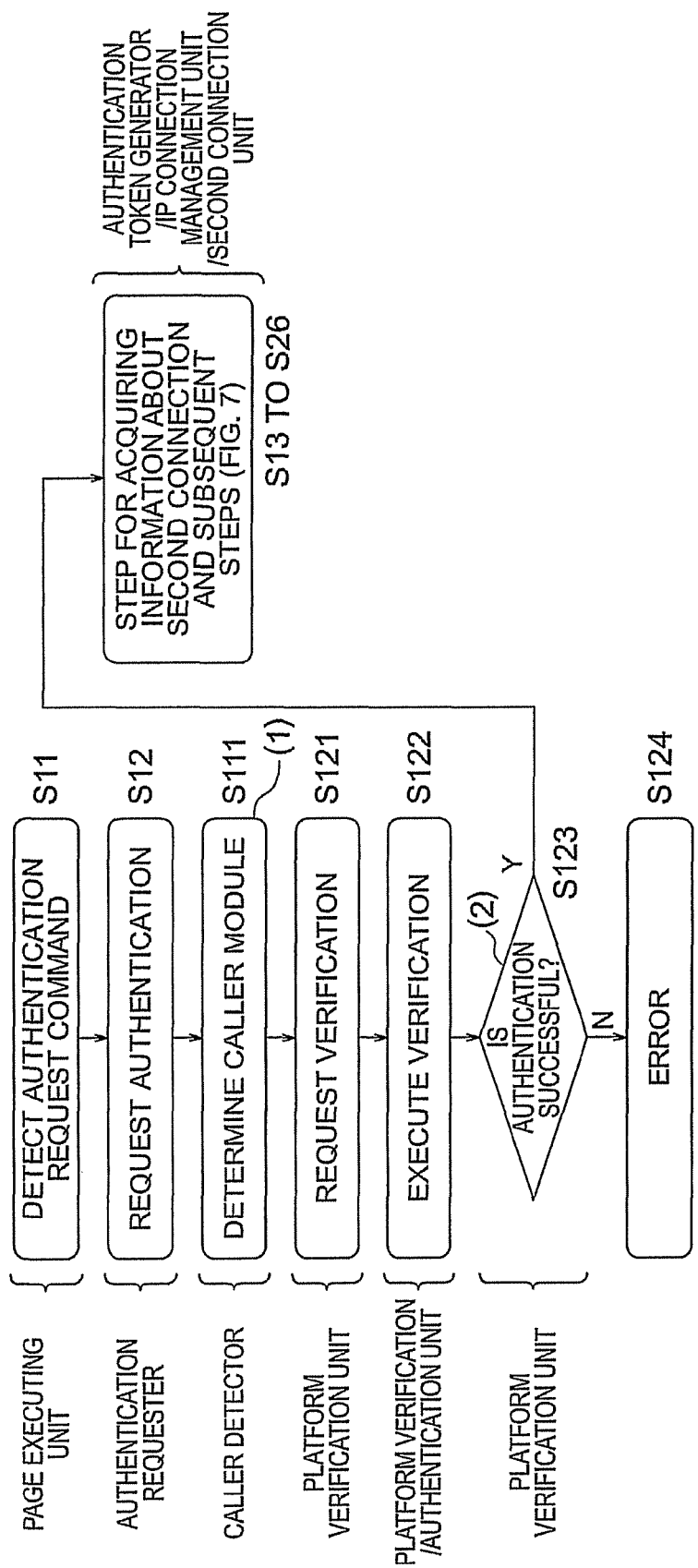
FIG. 24 is a flow chart showing the processing steps when an authentication request command is detected according to the sixth embodiment.

FIG. 24 is a flow chart showing the processing steps when an authentication request command is detected according to the sixth embodiment. The flow chart of FIG. 24 is different from FIG. 22 in the steps (1) and (2) for verifying the platform. Here, explanation will be given only on the steps (1) and (2).

When the authentication token generator 61 is called by the authentication requester 52, the authentication token generator 61 asks the caller detector 81 to detect a caller module (Step S12). The caller detector 81 determines the module calling the authentication token generator 61 (Step S111), and returns the identifier of the module to the authentication token generator 61. Further, the authentication token generator 61 passes the module identifier to the platform verification unit 82 to request authentication. The platform verification unit 82 requests the platform verification/authentication unit 57 to authenticate the received module identified by the module identifier (Step S121). The platform verification/authentication unit 57 responds to the authentication request using a key held by itself (Step S122). A generally known method such as challenge and response authentication should be used to perform this authentication. The platform verification unit 82 inspects the authentication result (Step S123). If the authentication is successful, the step for acquiring information about the second connection unit 34 and subsequent steps in FIG. 7 (Steps S13 to S26) are performed. On the other hand, if the authentication is failed, an error is raised (Step S124).

As stated above, in the sixth embodiment, when the Web application executing unit 21 can store secret information, the platform verification/authentication unit 57 provided in the Web application executing unit 21 makes it possible to specify which part of a Web application requesting authentication is calling the application authentication processing unit 23. This prevents the Web application executing unit 21 from being illegally faked.

Seventh Embodiment

In the first embodiment, validity of the key used to generate an authentication token is not checked.

If the key is stolen, the authentication token can be illegally generated, which allows an illegal platform to remotely operate the information output device 3. On the other hand, in a seventh embodiment, validity of the key for generating an authentication token is checked and an illegal key is revoked (invalidated), in order to counter the threat of a stolen key.

Figure 25:
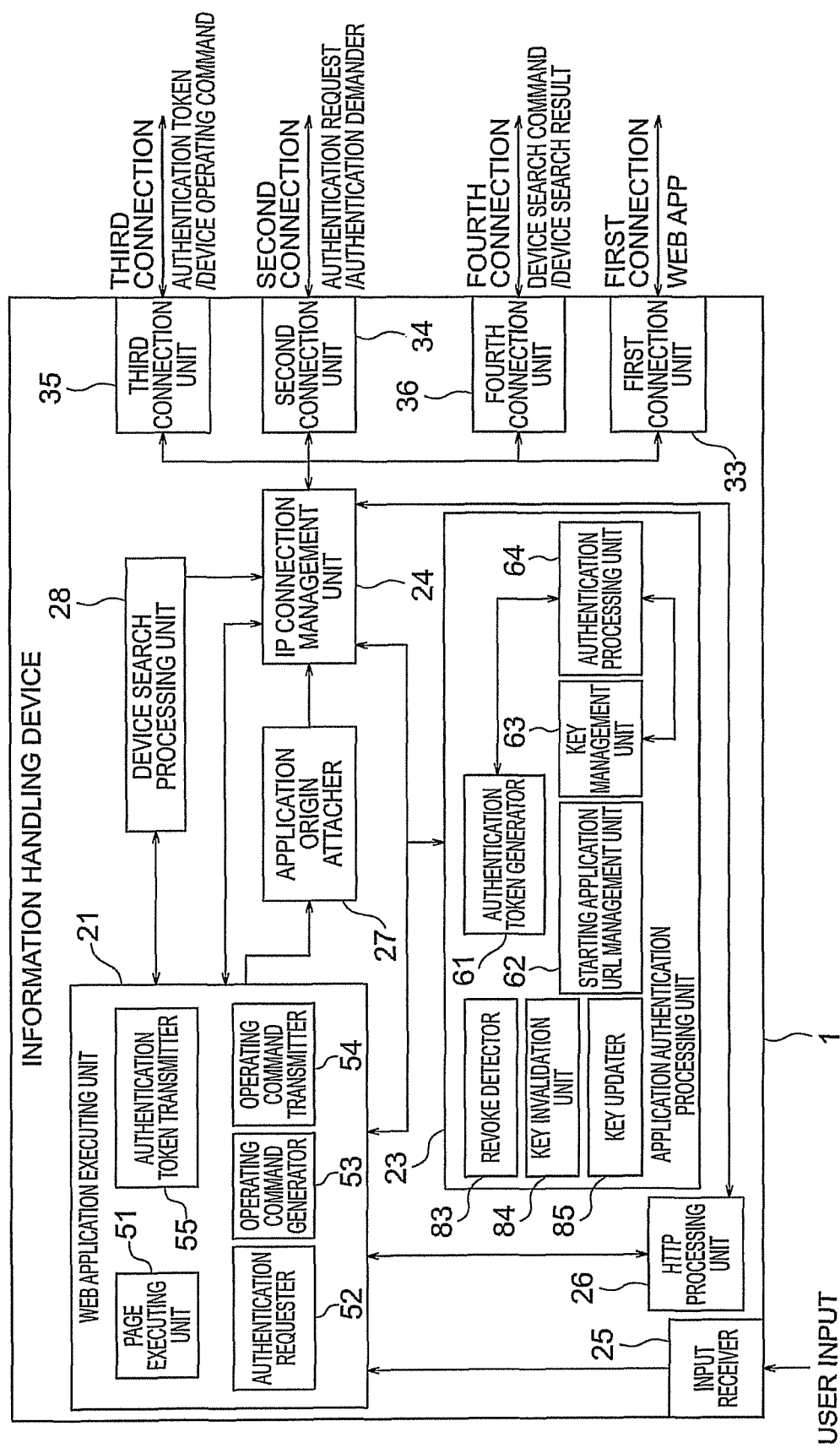
FIG. 25 is a block diagram showing the information handling device according to a seventh embodiment.

FIG. 25 is a block diagram showing the internal configuration of the information handling device according to the seventh embodiment. FIG. 25 is different from FIG. 3 in that the application authentication processing unit 23 further has a revoke detector 83, a key invalidation unit 84, and a key updater 85. In FIG. 25, the PF application executing unit 22 is omitted, but the application authentication processing unit 23 is provided within the PF application executing unit 22, similarly to FIG. 2.

Figures 26, 27:
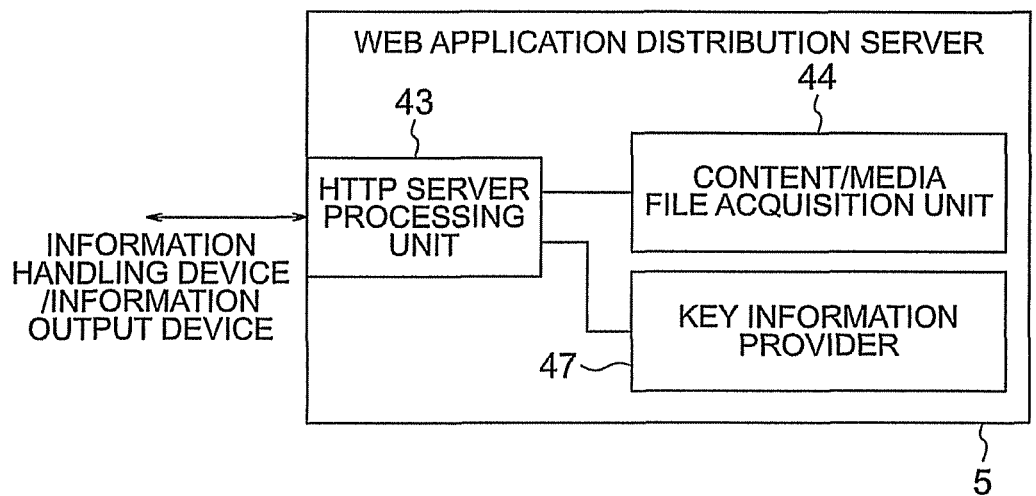
FIG. 26 is a diagram showing a table in which a correspondence relationship among key numbers, key validity, and key information is registered.
FIG. 27 is a block diagram showing the Web application distribution server 5 according to the seventh embodiment.

In the present embodiment, the key management unit 63 manages a plurality of keys as shown in FIG. 26, and distinguishes them by key numbers. Key data includes, e.g., key numbers, key validity and key information.

The revoke detector 83 detects an invalid (revokable) key. For example, the information output device 3 requested to perform authentication transmits a key number used for the authentication to the revoke detector 83 together with a challenge through the second connection unit 34, and the revoke detector 83 judges that the keys having key numbers smaller than the received key number are invalid. Further, the revoke detector 83 can inquire of the Web application distribution server 5 about the numbers of invalidated keys.

The key invalidation unit 84 receives, from the revoke detector 83, information about the numbers of revokable keys, and actually invalidate the keys. FIG. 26 shows an example of a table registering a correspondence relationship among key numbers, key validity, and key information managed by the key management unit 63. In FIG. 26, the key information initially shows that key number 0 is invalid and key numbers 1, 2 . . . N are valid. However, when the revoke detector 83 informs that the keys having key numbers smaller than 3 are invalid, the keys having key numbers 1 and 2 are made invalid in the table.

The key updater 85 downloads the latest key information from the Web application distribution server 5 through the IP connection management unit 24 and the first connection unit 33 called by the IP connection management unit 24, to perform signature verification. If no falsification is detected, the key updater 85 overwrites the key information stored in the operating device. Note that the key updater 85 is not essential.

FIG. 27 is a block diagram showing the internal configuration of the Web application distribution server 5 according to the seventh embodiment. FIG. 27 is different from FIG. 5 in that the Web application distribution server 5 further has a key information provider 47.

In accordance with a key information acquisition request from the information handling device 1 or the information output device 3, the key information provider 47 acquires the latest key information from the storage (not shown) of the Web application distribution server 5, and transmits it to the requester through the HTTP server processing unit 43.

Figure 28:
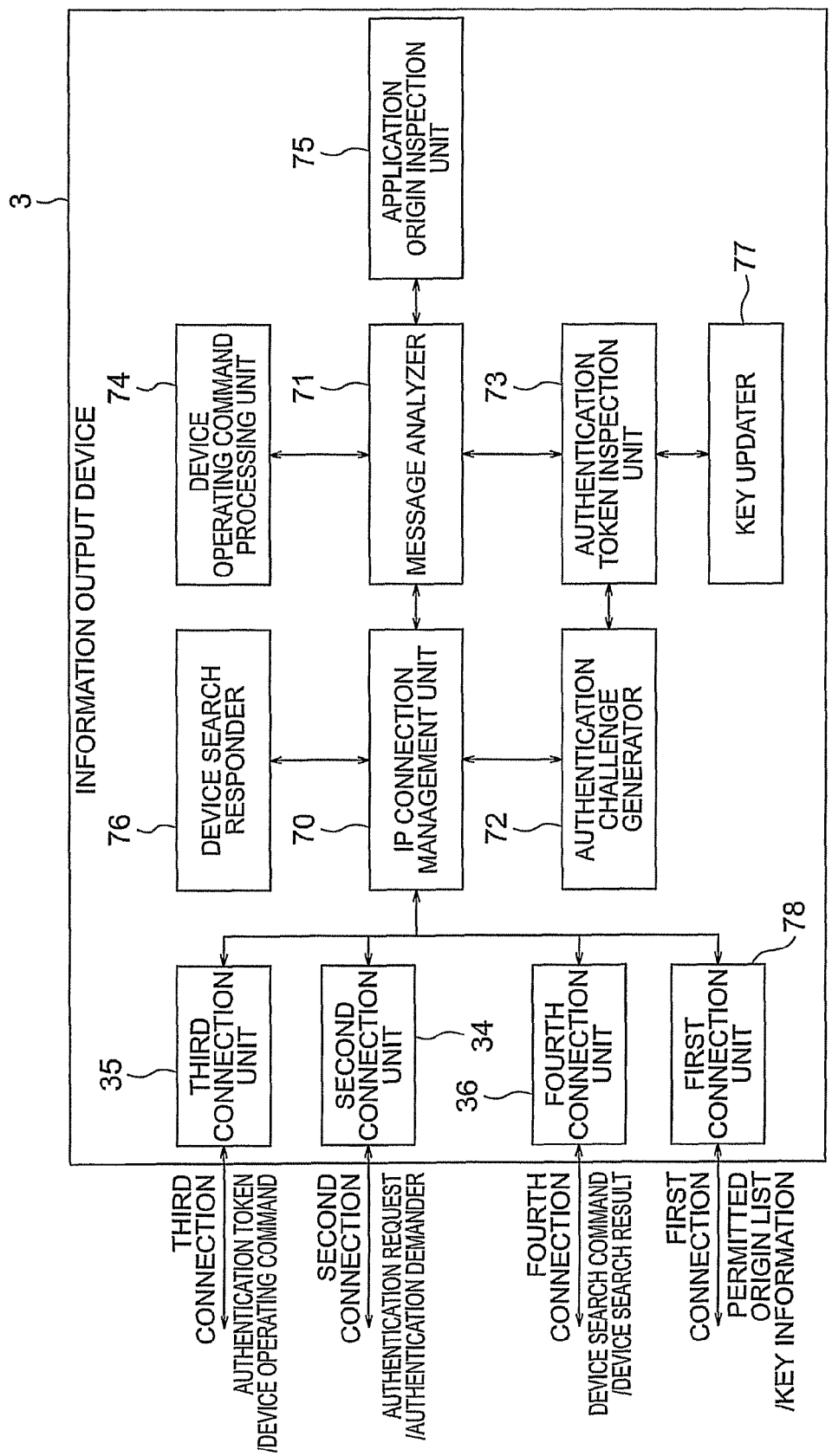
FIG. 28 is a block diagram showing the information output device 3 according to the seventh embodiment.

FIG. 28 is a block diagram showing the internal configuration of the information output device 3 according to the seventh embodiment.

FIG. 28 is different from FIG. 4 in that the information output device 3 further has a key updater 77.

The key updater 77 transmits a request to acquire the latest key information to the Web application distribution server 5 through the IP connection management unit 70 and the first connection unit 78 called by the IP connection management unit 70. Upon receiving the key information, the key updater 77 overwrites the key information stored in the storage (not shown) of the information output device 3 with the received key information. The key updater 77 is executed periodically or when the information output device 3 is started, to keep the latest key information.

Figure 29:
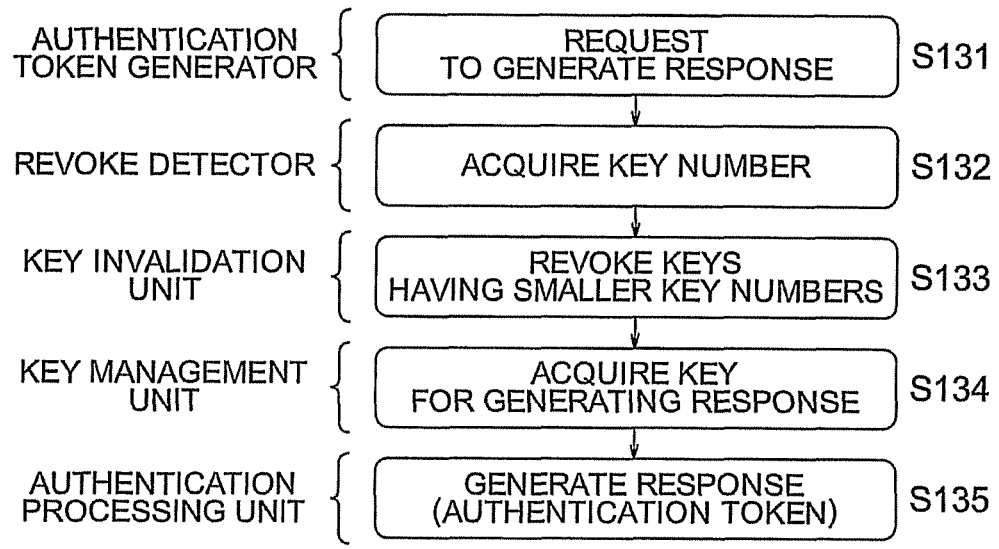
FIG. 29 is a flow chart showing the processing steps when transmitting an authentication request while performing revoke processing.

FIG. 29 is a flow chart showing the processing steps when transmitting an authentication request while performing revoke processing according to the seventh embodiment. The flow chart of FIG. 29 is different from FIG. 7 in the steps between the step of requesting to generate a response and the step of generating a response (authentication token). Here, explanation will be given mainly on differences.

After the authentication token generator 61 requests to generate a response corresponding to challenge information (Step S131), the revoke detector 83 acquires a key number (defined as N) notified by the information output device 3 through the second connection unit 34 (Step S132), judges that the keys having key numbers smaller than the acquired key number (0 . . . N−1) are invalid, and calls the key invalidation unit 84. The key invalidation unit 84 rewrites the key information as shown in FIG. 26 to make the keys having the key numbers 0 . . . N−1 invalid (Step S133). After that, the key management unit 63 acquires key information of the key having a key number of N (Step S134). The application authentication processing unit 23 generates a response based on the acquired key information and on the received challenge information, and returns it as an authentication token (Step S135).

Figure 30:
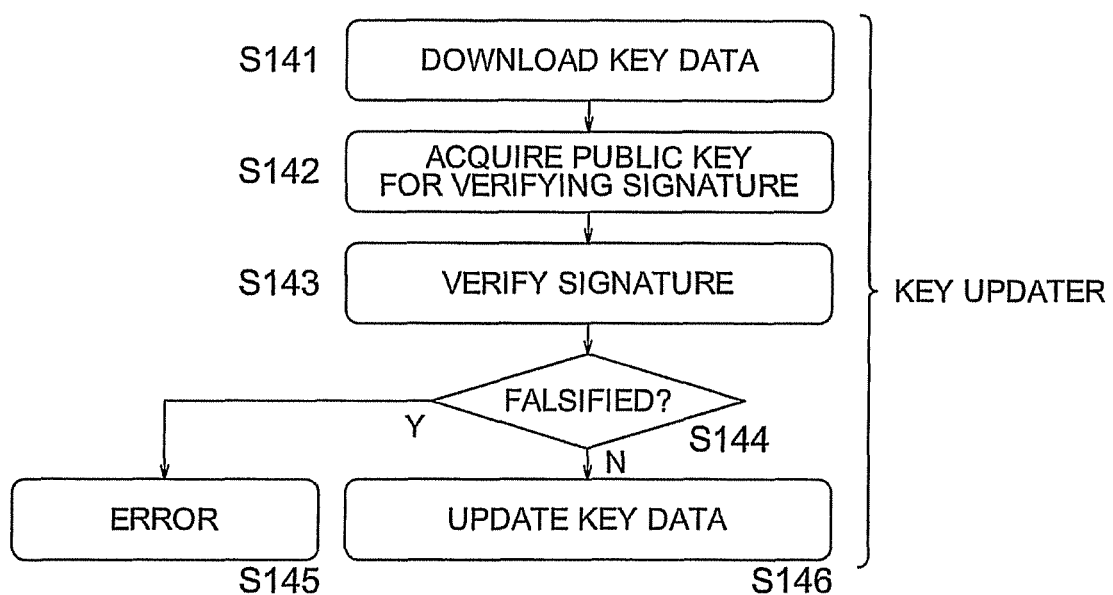
FIG. 30 is a flow chart showing the processing steps when updating a key according to the seventh embodiment.

FIG. 30 is a flow chart showing the processing steps when updating a key according to the seventh embodiment. The key updater 77 updates the key information periodically or when the information handling device 1 is started. First, the key updater 77 downloads the latest key data from the Web application distribution server 5 through the IP connection management unit 70 and the first connection unit 78 called by the IP connection management unit 70 (Step S141). Next, the key updater 77 reads a public signature verification key stored in the information handling device 1 (Step S142), and verifies the signature of the downloaded key data (Step S143). If any falsification is detected, the key updater 77 raises an error (Steps S144 and S145). If no falsification is detected, the key updater 77 overwrites the key data stored in the information handling device 1 in a format as shown in FIG. 30 with the downloaded key data (Steps S144 and S146).

As stated above, in the seventh embodiment, key data acquired from the Web application distribution server 5 is verified utilizing a public signature verification key held by the information handling device 1, and the key for generating an authentication token is updated if the verification is successful. In this way, key information can be updated safely.

Here, explanation will be given on the scenes where the invention according to the above embodiments can be utilized.

In recent years, it has become almost general to describe a rich client application (web application) in HTML or JavaScript. Correspondingly, it has become known to describe application software for executing digital equipment such as digital TV, cellular phone, smartphone, etc. as a web application. IPTV in the field of digital TV is a striking example, and there are standards for displaying a menu screen or a video replay screen using the techniques of the web application.

This web application is executed in the execution environment of a browser capable of interpreting HTML or JavaScript. This web application generally consists of a plurality of page files and media files. Here, the media files includes a file storing (moving) image data such as JPEG, GIF, MPEG, etc. and a file storing audio data such as MP3 etc. On the other hand, the page files may store control program information such as JavaScript, in addition to display character data and layout information of characters, images, etc. described in HTML etc. Further, JavaScript can achieve communication with an HTTP server or a Web-Socket server based on a protocol called HTTP (XM-LHTTPRequest) or WebSocket.

The HTTP server or WebSocket server having interfaces for handling various functions of the devices on the server makes it possible to remotely operate the devices. For example, when a WebSocket server is incorporated into a digital TV to providing the functions of channel change and programmed recording through the WebSocket protocol, channel change and programmed recording can be remotely operated by a web application running on a browser of, e.g., a tablet terminal.

When an information handling device such as a tablet terminal wirelessly transmits a device operating command for performing various functions of an information output device such as digital TV in order to remotely operate the information output device, the information handling device accesses a Web server to acquire and execute the web application describing the device operating command, and transmits the device operating command to the information output device based on the execution result.

Therefore, if the web application executed by the information handling device is not reliable, the information output device may possibly be freely operated. In such a case, the invention according to the above embodiments makes it possible to operate the information output device from the information handling device while preventing the information output device from being freely operated without user's permission, which leads to improvement of convenience.

At least a part of the information handling device 1 and information output device 3 explained in the above embodiments may be formed of hardware or software. In the case of software, a program realizing at least a partial function of the information handling device 1 and information output device 3 may be stored in a recording medium such as a flexible disc, CD-ROM, etc. to be read and executed by a computer. The recording medium is not limited to a removable medium such as a magnetic disk, optical disk, etc., and may be a fixed-type recording medium such as a hard disk device, memory, etc.

Further, a program realizing at least a partial function of the information handling device 1 and information output device 3 can be distributed through a communication line (including radio communication) such as the Internet. Furthermore, this program may be encrypted, modulated, and compressed to be distributed through a wired line or a radio link such as the Internet or through a recording medium storing it therein.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. An information handling device comprising:
a first connection unit to establish a connection for acquiring a web application from a first communication device in order to receive the web application;
a Web application executing unit to generate a device operating command by executing the web application received from the first communication device through the first connection unit, the device operating command being a command for remotely operating a second communication device;
a second connection unit to, when receiving a first authentication request from the web application, transmit a second authentication request to the second communication device, and establish a connection for receiving an authentication demander transmitted from the second communication device responding to the second authentication request in order to receive the authentication demander, the first authentication request including a random character string available one-time and being eliminated after a connection establishment by the second connection unit;
an application authentication processing unit to generate a platform authenticator by encrypting the authentication demander received from the second communication device through the second connection unit based on a common key shared with the second communication device and key information inputted by a user;
an application origin information attacher to attach origin information of the web application to the platform authenticator, the origin information being location information of the first communication device which acquires the web application; and
a third connection unit to establish a connection for transmitting the device operating command and the platform authenticator attached with the origin information to the second communication device in order to transmit the device operating command and the platform authenticator attached with the origin information;
a fourth connection unit to establish a connection for transmitting a device search command for searching the second communication device in order to transmit the device search command utilizing the established connection; and
a device search processing unit to receive, through the fourth connection unit, location identification information of the second communication device transmitted from the second communication device responding to the device search command,
wherein each of the second connection unit and the third connection unit establishes, based on the location identification information, a connection with the second communication device from which the location identification information is transmitted.

2. The device of claim 1, further comprising:
a permitted origin list acquisition unit to acquire a permitted origin list showing origins of web applications each capable of issuing a command to generate the platform authenticator; and
an application origin verification unit to verify whether the origin of the web application acquired through the first connection unit is included in the permitted origin list,
wherein the application authentication processing unit prohibits generating the platform authenticator when the application origin verification unit verifies that the origin of the web application acquired through the first connection unit is not included in the permitted origin list.

3. The device of claim 2, further comprising:
a permitted origin list inspection unit to verify whether a signature attached to the permitted origin list is correct by using a public signature verification key,
wherein the application authentication processing unit prohibits generating the platform authenticator when the permitted origin list inspection unit verifies that the signature is not correct.

4. The device of claim 3, wherein
the Web application executing unit acquires, through the first connection unit, a use certificate certifying that the web application is transmitted from the first communication device which is legitimate, and
the permitted origin list acquisition unit acquires the permitted origin list included in the use certificate.

5. The device of claim 3,
wherein the permitted origin list is provided corresponding to each web application.

6. The device of claim 2,
wherein the permitted origin list acquisition unit updates the permitted origin list by periodically receiving the latest permitted origin list transmitted from the first communication device through the first connection unit.

7. The device of claim 1, further comprising:
a platform verification unit to verify whether at least one of identification information of the Web application executing unit and procedure performed by the Web application executing unit to execute the web application coincides with corresponds to ones previously assumed, and
the application authentication processing unit generates the platform authenticator only when the platform verification unit confirms the coincidence.

8. The device of claim 1, further comprising:
a revoke detector to inquire of the first communication device about validity of the common key used to generate the platform authenticator; and
a key invalidation unit to invalidate the common key when receiving information showing that the common key is invalid from the first communication device responding to the inquiry from the revoke detector.

9. The device of claim 1, further comprising:
a key invalidation unit to receive key information of the common key used to generate the platform authenticator from the first communication device through the first connection unit in order to invalidate the common key based on the key information.

10. An information output device, comprising:
a first connection unit to establish a connection for acquiring, from a first communication device, a permitted origin list showing origins of web applications each capable of issuing a command to generate a platform authenticator;
a second connection unit to establish a connection for transmitting an authentication demander to the information handling device, responding to an authenticator corresponding to an authentication request from the information handling device, the authenticator including a random character string available one-time and being eliminated after a connection establishment by the second connection unit;

a third connection unit to establish a connection for receiving a device operating command and a platform authenticator from the information handling device, the device operating command that the information handling device remotely operates the information output device;

a permitted origin verification unit to verify whether origin information of a web application included in a request transmitted from the information handling device to establish a connection through the third connection unit is registered in the permitted origin list, the origin information being location information of the first communication device which acquires the web application;

an authenticator verification unit to verify whether the authenticator transmitted from the information handling device is registered in an authenticator list; and a connection management unit to perform control to receive the device operating command from the information handling device through the second connection unit when the permitted origin verification unit verifies that the origin information is registered and the authenticator verification unit verifies that the authenticator is registered.

11. A non-transitory recording medium for storing a program executed by a computer, the program comprising:

establishing a first connection for acquiring a web application from a first communication device in order to receive the web application;

generating a device operating command by executing the web application received from the first communication device, the device operating command being a command for remotely operating a second communication device;

when receiving an authentication request from the web application, transmitting an authentication request to the second communication device, and establishing a second connection for receiving an authentication demander transmitted from the second communication device responding to the authentication request in order to receive the authentication demander, the first authentication request including a random character string available one-time and being eliminated after an establishment of the second connection;

generating a platform authenticator by encrypting the authentication demander received from the second communication device based on a common key shared with the second communication device and key information inputted by a user;

attaching origin information of the web application to the platform authenticator, the origin information being location information of the first communication device which acquires the web application;

establishing a third connection for transmitting the device operating command and the platform authenticator attached with the origin information to the second communication device in order to transmit the device operating command and the platform authenticator attached with the origin information, establishing a fourth connection for transmitting a device search command for searching the second communication device in order to transmit the device search command utilizing the established connection; and receiving location identification information of the second communication device transmitted from the second communication device responding to the device search command, wherein each of the second connection and the third connection is established, based on the location identification information, a connection with the second communication device from which the location identification information is transmitted.

12. The medium of claim 11, further comprising:

acquiring a permitted origin list showing origins of web applications each capable of issuing a command to generate the platform authenticator; and verifying whether the origin of the web application acquired through the first connection is included in the permitted origin list, wherein the generating of the platform authenticator prohibits generating the platform authenticator when it is verified that the origin of the web application acquired through the first connection is not included in the permitted origin list.

13. The medium of claim 12, further comprising:

verifying whether a signature attached to the permitted origin list is correct by using a public signature verification key, wherein the generating of the platform authenticator prohibits generating the platform authenticator when it is verified that the signature is not correct.

14. The medium of claim 13, wherein the generating of the device operating command acquires, through the first connection, a use certificate certifying that the web application is transmitted from the first communication device which is legitimate, and the acquiring of the permitted origin list acquires the permitted origin list included in the use certificate.

15. The medium of claim 13, wherein the permitted origin list is provided corresponding to each web application.

16. The medium of claim 12, wherein the acquiring of the permitted origin list updates the permitted origin list by periodically receiving the latest permitted origin list transmitted from the first communication device through the first connection unit.

17. The medium of claim 11, further comprising:

verifying whether at least one of identification information of the generating of the device operating command and procedure performed by the generating of the device operating command to execute the web application coincides with corresponds to ones previously assumed, and the generating of the platform authenticator generates the platform authenticator only when the coincidence is confirmed.

18. The medium of claim 11, further comprising:

inquiring of the first communication device about validity of the common key used to generate the platform authenticator; and invalidating the common key when receiving information showing that the common key is invalid from the first communication device responding to the inquiry.

* * * * *